(12) United States Patent
Kitahara

(10) Patent No.: US 11,889,161 B2
(45) Date of Patent: Jan. 30, 2024

(54) RECEIVING DEVICE, RECEIVING METHOD, SIGNAL PROCESSING DEVICE, AND SIGNAL PROCESSING METHOD

(71) Applicant: SATURN LICENSING LLC, New York, NY (US)

(72) Inventor: Jun Kitahara, Shizuoka (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 16/980,763

(22) PCT Filed: Mar. 8, 2019

(86) PCT No.: PCT/JP2019/009266
§ 371 (c)(1),
(2) Date: Sep. 14, 2020

(87) PCT Pub. No.: WO2019/181552
PCT Pub. Date: Sep. 26, 2019

(65) Prior Publication Data
US 2021/0377621 A1     Dec. 2, 2021

(30) Foreign Application Priority Data
Mar. 22, 2018     (JP) ................................ 2018-054227

(51) Int. Cl.
*H04N 7/10*     (2006.01)
*H04N 21/488*     (2011.01)
(Continued)

(52) U.S. Cl.
CPC ........ *H04N 21/4882* (2013.01); *H04H 20/59* (2013.01); *H04N 21/4334* (2013.01); *H04N 21/4432* (2013.01); *H04N 21/814* (2013.01)

(58) Field of Classification Search
CPC ........... H04N 21/4882; H04N 21/4334; H04N 21/4432; H04N 21/814; H04N 21/442;
(Continued)

(56) References Cited

U.S. PATENT DOCUMENTS 8,832,731 B1 *  9/2014  Sennett .................. H04H 20/59
                                                  725/33
2005/0015799 A1 *  1/2005  Park .................... H04N 21/2362
                                                  348/E7.054
(Continued)

FOREIGN PATENT DOCUMENTS

CN     105519124     4/2016
CN     106537822     3/2017
(Continued)

OTHER PUBLICATIONS

"ATSC Standard: Signaling, Delivery, Synchronization, and Error Protection," Doc. A/331:2017, Advanced Television Systems Committee, URL:https://www.atsc.org/wpcontent/uploads/2017/12/A331-2017-SignalingDeivery-Sync-FEC-1.pdf, Dec. 6, 2017, pp. 180-188 (11 total pages).
(Continued)

*Primary Examiner* — Annan Q Shang
(74) *Attorney, Agent, or Firm* — Chris Kolefas

(57) ABSTRACT

The present technology relates to a receiving device, a receiving method, a signal processing device, and a signal processing method that enable presentation of emergency alert information more appropriately.
Provided is a receiving device including: a receiving part that receives a broadcast signal; and a processing part that processes the broadcast signal that has been received, in which the receiving part instructs the processing part in a standby state to start on the basis of emergency alert start information included in the broadcast signal that has been received, and in a case of being instructed by the receiving
(Continued)

part to start, the processing part controls presentation of emergency alert information on the basis of signaling including the emergency alert information acquired from the broadcast signal that has been received, and receiving setting information related to a receiving setting of the emergency alert information set by a user. The present technology can be applied to, for example, a television receiver.

20 Claims, 26 Drawing Sheets

(51) Int. Cl.
*H04H 20/59* (2008.01)
*H04N 21/433* (2011.01)
*H04N 21/443* (2011.01)
*H04N 21/81* (2011.01)

(58) Field of Classification Search
CPC ........... H04N 21/488; H04N 21/23617; H04N 21/4348; H04H 20/59; H04H 20/48; G08B 21/00; G08B 27/00; H04B 1/16
See application file for complete search history.

(56) References Cited

U.S. PATENT DOCUMENTS

| | | | | |
|---|---|---|---|---|
| 2007/0094680 A1* | 4/2007 | Kim | ................... | H04N 21/4882 |
| | | | | 348/E5.003 |
| 2009/0133056 A1* | 5/2009 | Yun | ....................... | H04H 20/59 |
| | | | | 725/33 |
| 2010/0070994 A1* | 3/2010 | Yun | ..................... | H04N 21/6543 |
| | | | | 340/687 |
| 2011/0280381 A1 | 11/2011 | Okamoto et al. | | |
| 2014/0059594 A1* | 2/2014 | Stein | ................... | H04N 21/6405 |
| | | | | 725/33 |
| 2015/0016453 A1* | 1/2015 | Kim | ....................... | H04W 4/90 |
| | | | | 370/390 |
| 2016/0198240 A1* | 7/2016 | Kim | ..................... | H04N 21/814 |
| | | | | 725/33 |
| 2019/0028872 A1* | 1/2019 | Ms | ..................... | H04N 21/4882 |
| 2020/0106823 A1* | 4/2020 | Kwon | ................... | H04L 65/611 |

FOREIGN PATENT DOCUMENTS

| | | |
|---|---|---|
| JP | 2011-239296 A | 11/2011 |
| JP | 2012-156606 A | 8/2012 |
| JP | 2013005053 | 1/2013 |
| KR | 20080066423 | 7/2008 |
| WO | WO 2017/047397 A1 | 3/2017 |

OTHER PUBLICATIONS

International Search Report dated Apr. 23, 2019 in PCT/JP2019/009266 filed on Mar. 8, 2019, 2 pages.

* cited by examiner

FIG. 3

| EA Wakeup | DESCRIPTION |
|---|---|
| 00 | EMERGENCY ALERT INFORMATION HAS NOT BEEN TRANSMITTED |
| 01 | EMERGENCY ALERT INFORMATION HAS BEEN TRANSMITTED (SETTING 1) |
| 10 | EMERGENCY ALERT INFORMATION HAS BEEN TRANSMITTED (SETTING 2) |
| 11 | EMERGENCY ALERT INFORMATION HAS BEEN TRANSMITTED (SETTING 3) |

*FIG. 10*

| Syntax | No. of Bits | Format |
|---|---|---|
| bootstrap_symbol_1() { | | |
| ea_wake_up_1 | 1 | uimsbf |
| min_time_to_next | 5 | uimsbf |
| system_bandwidth | 2 | uimsbf |
| } | | |

FIG. 11

| Syntax | No. of Bits | Format |
|---|---|---|
| bootstrap_symbol_2() { | | |
| ea_wake_up_2 | 1 | uimsbf |
| bsr_coefficient | 7 | uimsbf |
| } | | |

FIG. 12

| | | | | | | |
|---|---|---|---|---|---|---|
| | Media Processing Unit (MPU) | Signaling | Signaling | NRT | DASH | NRT | Signaling |
| SLT, AEAT | MPEG Media Transport Protocol (MMTP) | | | ROUTE (ALC/LCT) | | HTTP |
| UDP | UDP | | | UDP | | TCP |
| IP | IP | | | IP | | IP |
| | Link Layer Protocol | | | | | Data Link Layer |
| | Physical Layer | | | | | Physical Layer |
| | Broadcast | | | | | Broadband |

FIG. 13

| Syntax | No. of Bits | Format |
|---|---|---|
| LLS_table() { | | |
|   LLS_table_id | 8 | uimsbf |
|   LLS_group_id | 8 | uimsbf |
|   group_count_minus1 | 8 | uimsbf |
|   LLS_table_version | 8 | uimsbf |
|   switch(LLS_table_id) { | | |
|     case 0x01: | | |
|       SLT | var | Sec. 6.3 |
|       break; | | |
|     case 0x02: | | |
|       RRT | var | See Annex F |
|       break; | | |
|     case 0x03: | | |
|       SystemTime | var | Sec. 6.4 |
|       break; | | |
|     case 0x04: | | |
|       AEAT | var | Sec. 6.5 |
|       break; | | |
|     case 0x05: | | |
|       OnscreenMessageNotification | var | Sec. 6.6 |
|       break; | | |
|     default: | | |
|       reserved | var | |
|   } | | |
| } | | |

FIG. 14

| Element or Attribute Name | Use | Data Type | Short Description |
|---|---|---|---|
| AEAT | | | Root element of the AEAT |
| AEA | 1..N | | Advanced Emergency Alert formatted as AEA-MF. |
| @aeaId | 1 | string | The identifier of AEA message. |
| @issuer | 1 | string | The identifier of the broadcast station originating or forwarding the message. |
| @audience | 1 | string | The intended distribution of the AEA message. |
| @aeaType | 1 | string | The category of the message. |
| @refAEAId | 0..1 | string | The referenced identifier of AEA message. It shall appear when the @aeaType is "update" or "cancel" and shall not appear when the @aeaType is "alert". |
| @priority | 0..1 | unsignedByte | The priority of the message. It shall appear when the @aeaType is "alert" or "update" and may appear when the @aeaType is "cancel". |
| @wakeup | 0..1 | boolean | Indication that this AEA is associated with a wake-up event. |
| Header | 0..1 | | The container for the basic alert envelope. |
| @effective | 0..1 | dateTime | The effective time of the AEA message. It appears when the @aeaType is "alert" or "update." If omitted, the default is immediate. |
| @expires | 0..1 | dateTime | The expiration time of the AEA message. It appears when the @aeaType is "alert" or "update". |
| EventCode | 0..1 | string | A code identifying the event type of the AEA message. |
| @type | 0..1 | string | A national-assigned string designating the domain of the code (e.g. SAME in US, ...). |
| EventDesc | 0..N | string | The short plain text description of the emergency event (e.g. "Tornado Warning" or "Tsunami Warning." |
| @lang | 1 | lang | The code denoting the language of the respective element of the EventDesc. |
| Location | 0..N | string | The geographic code delineating the affected area of the AEA message. It appears when the @aeaType is "alert" or "update" and can appear when the @aeaType is "cancel". |
| @type | 1 | string | A national-assigned string designating the domain of the code (e.g. FIPS in US or "SGC" in Canada). |

FIG. 15

| Element or Attribute Name | Use | Data Type | Short Description |
|---|---|---|---|
| AEAText | 0..N | string | Contains the specific text of the emergency notification. It appears when the @aeaType is "alert" or "update" and can appear when the @aeaType is "cancel". |
| @lang | 1 | lang | The code denoting the language of the respective element of the AEA message text |
| LiveMedia | 0..1 | | Contains the information of emergency-related live A/V service which is delivered via broadcast stream. |
| @bsid | 1 | aeat:listOf UnsignedShort | Identifier of the Broadcast Stream contains the emergency-related live A/V service. |
| @serviceId | 1 | unsignedShort | Integer number that identifies the emergency-related A/V Service. |
| ServiceName | 0..N | string | A user-friendly name for the service where the LiveMedia is available |
| @lang | 1 | lang | The language of the text described in the ServiceName element |
| Media | 0..N | | Contains the component parts of the multimedia resource. |
| @lang | 0..1 | lang | The code denoting the language of the respective element Media |
| @mediaDesc | 0..1 | string | Text describing the type and content of the media file |
| @mediaType | 0..1 | string | Text identifying the intended use of the associated media. |
| @url | 1 | anyURI | URL of the media file |
| @alternateUrl | 0..1 | anyURI | Alternate URL of the media file when it is also available via non-broadcast delivery(i.e. via the Internet) |
| @contentType | 0..1 | string | IANA media type of media content referenced by Media@url |
| @contentLength | 0..1 | unsignedLong | Size in bytes of media content referenced by Media@url |
| @mediaAssoc | 0..1 | anyURI | URI of another Media element with which this attribute is associated |

FIG. 22

| | | | |
|---|---|---|---|
| AEAT | AEA | @audience | • public : EMERGENCY ALERT INFORMATION FOR GENERAL RECEIVERS<br>• restricted : EMERGENCY ALERT INFORMATION FOR RESTRICTED RECEIVERS<br>• private : EMERGENCY ALERT INFORMATION FOR DESIGNATED RECEIVERS |
| | | @aeaType | • alert : NEW EMERGENCY ALERT INFORMATION<br>• update : UPDATE INFORMATION OF ALREADY DISTRIBUTED EMERGENCY ALERT INFORMATION<br>• cancel : CANCEL OF ALREADY DISTRIBUTED EMERGENCY ALERT INFORMATION |
| | | @priority | • PRIORITY OF EMERGENCY ALERT INFORMATION<br>(0-4: 4 IS HIGHEST PRIORITY AND 0 IS LOWEST PRIORITY) |
| | | Header.EventCode | • EVENT TYPE OF EMERGENCY ALERT INFORMATION<br>(FOR EXAMPLE, "EVI" IS evacuation warning) |
| | | Header.Location | • RELEVANT AREA OF EMERGENCY ALERT INFORMATION<br>(FOR EXAMPLE, SEVEN-DIGIT CODE CALLED FIPS) |
| | | @aeaId, @refAEAId | • ID THAT IDENTIFIES EMERGENCY ALERT INFORMATION<br>• @aeaId : SET FOR AEAT WITH @aeaType OF "alert"<br>• FOR AEAT WITH @aeaType OF "update", "cancel", @aeaId OF TARGET AEAT IS DESCRIBED IN @refAEAId | they be # RECEIVING DEVICE, RECEIVING METHOD, SIGNAL PROCESSING DEVICE, AND SIGNAL PROCESSING METHOD

TECHNICAL FIELD

The present technology relates to a receiving device, a receiving method, a signal processing device, and a signal processing method, and more particularly, to a receiving device, a receiving method, a signal processing device, and a signal processing method that enable presentation of emergency alert information more appropriately.

BACKGROUND ART

Some broadcasting systems prescribe an emergency alert service for presenting emergency alert information in an emergency (for example, see Patent Document 1). Patent Document 1 discloses, as an emergency alert service, forcibly starting a receiver (for example, a television receiver) that is in a standby mode (standby state) in an emergency on the basis of a wake-up flag included in a physical layer frame.

CITATION LIST

Patent Document

Patent Document 1: International Publication No. 2017/047397

SUMMARY OF THE INVENTION

Problems to be Solved by the Invention

By the way, the function of forcibly starting the receiver that is in the standby state and presenting the emergency alert information in an emergency allows more receivers to present the emergency alert information, but on the other hand, the receiver can be started at a timing not intended by the user. Therefore, there is a possibility that the convenience of the user is impaired depending on the way of operating the function. Therefore, a proposal for more appropriately presenting emergency alert information has been demanded.

The present technology has been made in view of such circumstances, and is intended to enable presentation of emergency alert information more appropriately.

Solutions to Problems

A receiving device according to a first aspect of the present technology is a receiving device including: a receiving part that receives a broadcast signal; and a processing part that processes the broadcast signal that has been received, in which the receiving part instructs the processing part on standby to start on the basis of emergency alert start information included in the broadcast signal that has been received, and in a case of being instructed by the receiving part to start, the processing part controls presentation of emergency alert information on the basis of signaling including the emergency alert information acquired from the broadcast signal that has been received, and receiving setting information related to a receiving setting of the emergency alert information set by a user.

The receiving device according to the first aspect of the present technology may be an independent device, or may be an internal block included in one device. Furthermore, the receiving method according to the first aspect of the present technology is a receiving method corresponding to the above-described receiving device according to the first aspect of the present technology.

In the receiving device and the receiving method according to the first aspect of the present technology, the receiving part instructs the processing part on standby to start on the basis of emergency alert start information included in the broadcast signal that has been received, and in a case of being instructed by the receiving part to start, the processing part controls presentation of emergency alert information on the basis of signaling including the emergency alert information acquired from the broadcast signal that has been received, and receiving setting information related to a receiving setting of the emergency alert information set by a user.

A signal processing device according to a second aspect of the present technology is a signal processing device including a control part that, in a case of being instructed by a receiving part that receives a broadcast signal during standby to start, controls presentation of emergency alert information on the basis of signaling including the emergency alert information acquired from the broadcast signal that has been received, and receiving setting information related to a receiving setting of the emergency alert information set by a user.

The signal processing device according to the second aspect of the present technology may be an independent device, or may be an internal block included in one device. Furthermore, the signal processing method according to the second aspect of the present technology is a signal processing method corresponding to the signal processing device according to the above-described second aspect of the present technology.

In the signal processing device and the signal processing method according to the second aspect of the present technology, in a case of being instructed by a receiving part that receives a broadcast signal during standby to start, presentation of emergency alert information is controlled on the basis of signaling including the emergency alert information acquired from the broadcast signal that has been received, and receiving setting information related to a receiving setting of the emergency alert information set by a user.

Effects of the Invention

According to a first aspect and a second aspect of the present technology, it is possible to more appropriately present emergency alert information.

Note that the effects described herein are not necessarily limited, and any of the effects described in the present disclosure may be applied.

BRIEF DESCRIPTION OF DRAWINGS

FIG. 3 is a diagram showing meaning of values of the bit of EA Wake up.

FIG. 10 is a diagram showing an example of syntax of Bootstrap Symbol 1.

FIG. 11 is a diagram showing an example of syntax of Bootstrap Symbol 2.

FIG. 12 is a diagram showing an example of a protocol stack of an IP transmission system.

FIG. 13 is a diagram showing an example of syntax of an LLS table.

FIG. 14 is a diagram showing an example of syntax of AEAT metadata.

FIG. 15 is a diagram showing an example of syntax of AEAT metadata.

FIG. 22 is a diagram showing an example of comparison items of start determination processing of the receiving system.

MODE FOR CARRYING OUT THE INVENTION

Hereinafter, embodiments of the present technology will be described with reference to the drawings. Note that the description will be given in the following order.

1. Embodiment of present technology
2. Modification
3. Computer configuration

Figure 1:
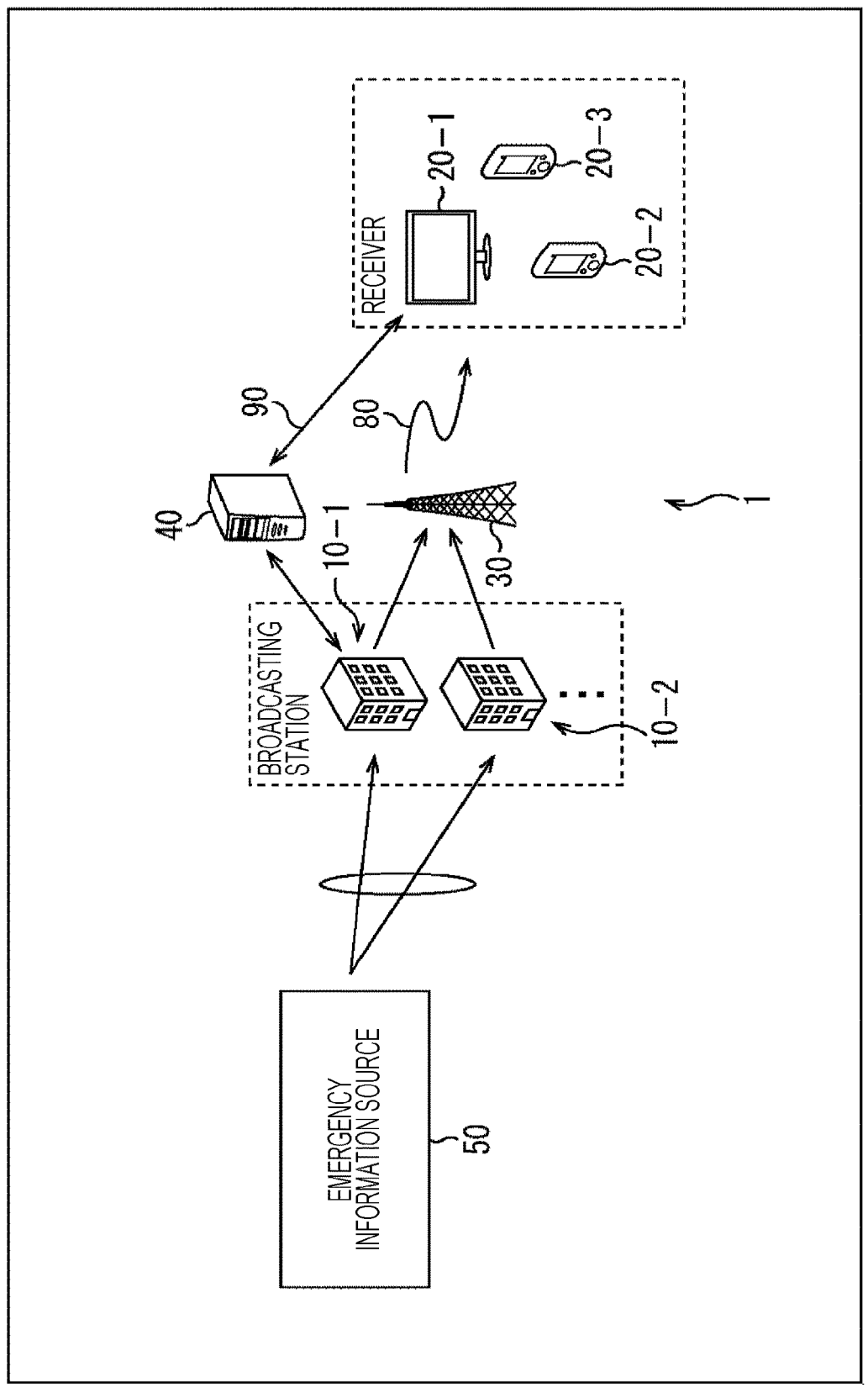
FIG. 1 is a diagram showing a configuration of an embodiment of a transmission system to which the present technology is applied.

1. Embodiment of Present Technology (Configuration Example of Transmission System)
FIG. 1 is a diagram showing a configuration of an embodiment of a transmission system to which the present technology is applied. Note that the system refers to one in which a plurality of devices is logically assembled.

In a transmission system 1, each broadcasting station is provided with a transmission device 10 (for example, a transmission device 10-1 or a transmission device 10-2). The transmission device 10 transmits a broadcast stream including content such as broadcast programs and commercials as a digital broadcast signal.

The digital broadcast signal from the transmission device 10 is received by a receiving device 20 via a radio tower 30 and the like and through a transmission path 80. The receiving device 20 is, for example, a fixed receiver (for example, a receiving device 20-1) such as a television receiver, a set top box (STB), or a recorder, or, for example, a mobile receiver (for example, a receiving device 20-2 and a receiving device 20-3) such as a mobile phone, smartphone, or tablet terminal. The receiving device 20 processes a broadcast stream acquired from the digital broadcast signal and reproduces video and audio of content such as a broadcast program and commercial.

Furthermore, in FIG. 1, the transmission system 1 includes a configuration corresponding to an emergency announcement system, and in an emergency, each broadcasting station or the like provides (issues notification of) emergency alert information that is information required to be announced emergently to the receiving device 20.

Specifically, in the transmission system 1, in an emergency, emergency information source information (for example, an emergency alert issued at the time of a disaster and the like) of which notification is made from an emergency information source 50 is converted into a predetermined format such as CAP information, and is provided to each broadcasting station (transmission device 10 thereof). Note that the CAP information is based on the common alerting protocol (CAP) defined by the Organization for the Advancement of Structured Information Standards (OASIS).

For example, the broadcasting station (transmission device 10 thereof) embeds the CAP information corresponding to the emergency information source information from the emergency information source 50 in a video of a broadcast program (uncompressed video data), and encodes the CAP information, or converts the CAP information into a predetermined format to generate emergency alert information. Then, the broadcasting station (transmission device 10 thereof) transmits the generated emergency alert information to a large number of receiving devices 20 (for example, receiving devices 20-1 to 20-3 and the like) in the broadcast area.

Therefore, in the receiving device 20, the emergency alert information is superimposed and presented on the video of the broadcast program. As a result, the user can check the emergency alert information (for example, text information) presented on the screen of the receiving device 20.

Furthermore, the broadcasting station (transmission device 10 thereof) can generate an emergency information application (for example, more detailed information associated with the emergency alert) on the basis of the CAP information according to the emergency information source information from the emergency information source 50 to provide the emergency information application to an EA server 40.

In a case of having a communication function, the receiving device 20 can access the EA server 40 via a communication line 90 such as the Internet or a mobile phone network and request an emergency information application. Then, the receiving device 20 can receive and execute the emergency information application distributed from the EA server 40 via the communication line 90. Therefore, for example, more detailed information associated with the emergency alert information is presented on the screen of the receiving device 20.

Note that, in the broadcasting station (transmission device 10 thereof), the method of generating the emergency alert information is not limited to the above-described method, and for example, another generation method may be used, such as using the CAP information in its original format. Furthermore, the CAP information as information for generating the emergency alert information is an example, and the emergency alert information may be generated by using, for example, the information acquired by converting the emergency information source information into a format conforming to another method.

Furthermore, for example, in the transmission system 1 of FIG. 1, the transmission device 10 and the receiving device 20 can be configured to perform data transmission conforming to the Advanced Television Systems Committee (ATSC) 3.0 which is a US next-generation broadcasting standard, via the transmission path 80.

Here, in the United States, an emergency announcement system called emergency alerting system (EAS) has been built, and in an emergency, emergency information source information (for example, an emergency alert issued at the time of a disaster and the like) notified from the Federal Emergency Management Agency (FEMA) as the emergency information source 50, the presidential palace or the like is converted into CAP information and the CAP information is provided to each broadcasting station.

That is, since an emergency announcement system called EAS is in place in the United States, by using this EAS, emergency information (CAP information) of various levels from the president's top priority to local announcement is announced (notification thereof is issued) by various media (for example, via broadcasting or communication and the like).

By the way, in the broadcasting system such as the ATSC3.0, there is a system in which the function of forcibly starting the receiving device 20 that is in the standby mode (standby state) and presenting the emergency alert information is defined in addition to the distribution of the emergency alert information.

Figure 2:
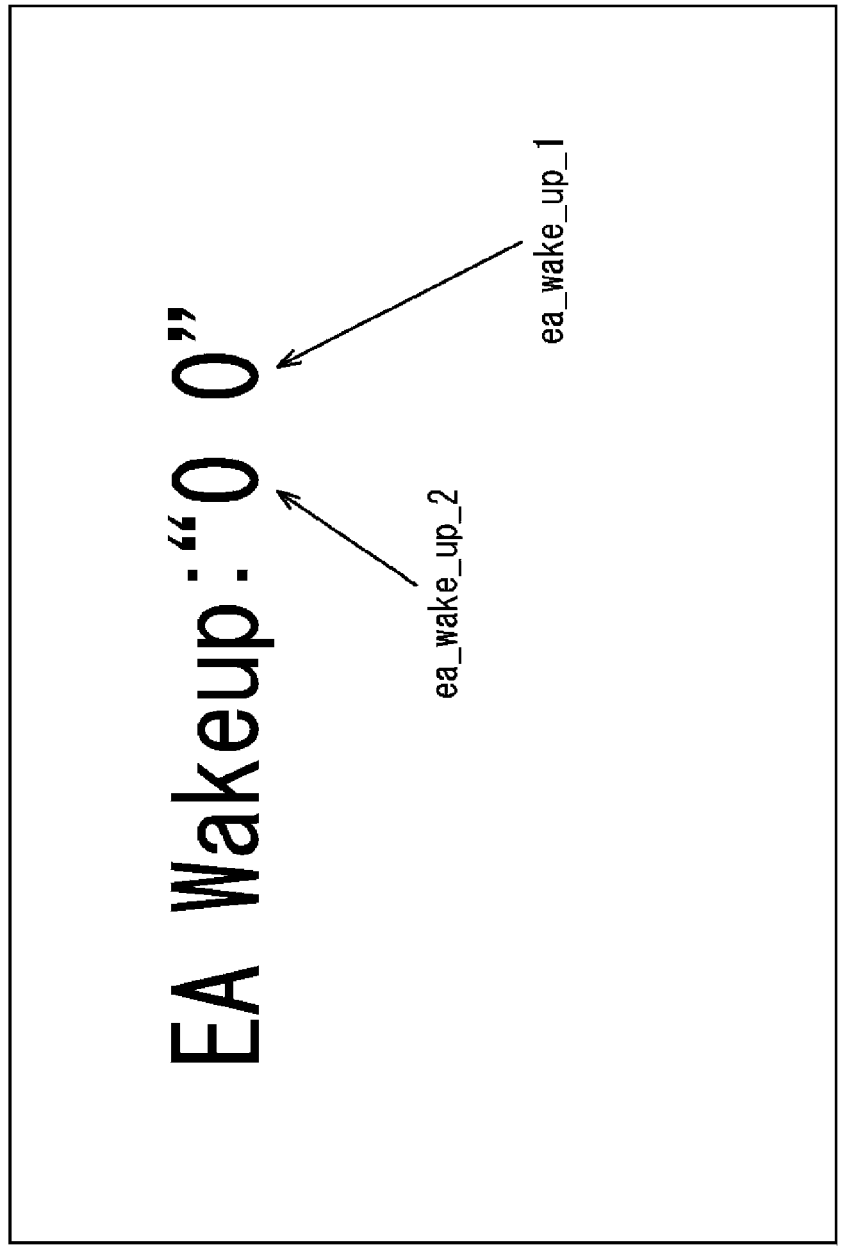
FIG. 2 is a diagram showing an example of a bit configuration of EA Wake up.

For example, in the ATSC3.0, EA wakeup information (emergency alert wakeup) is transmitted by bootstrapping of a physical layer frame. As shown in FIG. 2, the EA wakeup information includes 2 bits of ea_wake_up_1 and ea_wake_up_2, and the ATSC3.0 defines the operation when the receiving device 20 receives the EA wakeup information.

In other words, 1 bit of ea_wake_up_1 is set to the least significant bit (LSB), 1 bit of ea_wake_up_2 is set to the most significant bit (MSB) so that the EA wakeup information is set to 2 bits, and thereby, as shown in FIG. 3, four meanings of "00", "01", "10", and "11" are provided.

Specifically, as shown in FIG. 3, in a case where EA Wakeup="00" is satisfied, it means that there is no transmission of emergency alert information. Furthermore, in a case where EA Wakeup="01", "10", "11" is satisfied, it means that there is transmission of emergency alert information. In other words, EA Wakeup="00" indicates that the emergency alert information is inactive, and EA Wakeup="01", "10", "11" indicates that the emergency alert information is active. However, the way to use the settings (settings 1, 2, 3) of active ("01", "10", "11") will be determined according to, for example, the operation of the broadcaster.

Here, the transmission device 10 can change three states of "01", "10", and "11" indicating active to notify the receiving device 20 that the emergency alert information has been changed (updated). Therefore, the receiving device 20 can provide the emergency alert information to the user early by forcibly starting from the standby state.

For example, the receiving device 20 includes a broadcasting tuner part and a broadcast signal processing part (for example, a broadcasting tuner part 201 and a broadcast signal processing part 202 in FIG. 16 as described later). The broadcast signal processing part has a function of processing packets output from the broadcasting tuner part to render video, audio, broadcast applications, or the like, and is configured as, for example, a system-on-chip (SoC).

In a case of such a configuration, since the EA wakeup information is transmitted by bootstrapping of the physical layer frame, it is assumed that the EA wakeup information is acquired by the broadcasting tuner part. In other words, in the receiving device 20, it is assumed that the broadcasting tuner part issues an instruction to change the broadcast signal processing part (SoC) in the subsequent stage from the standby state to the started state on the basis of the EA wakeup information so that the broadcast signal processing part (SoC) performs processing related to emergency alert information. That is, it can be said that the EA wakeup information is emergency alert start information.

Therefore, the receiving device 20 can off the power of the broadcast signal processing part (SoC) in the standby mode so that power consumption is suppressed, and, in a case where emergency alert information is issued, the receiving device 20 can start the broadcast signal processing part (SoC) to present the emergency alert information. Accordingly, it becomes possible to deliver the emergency alert information to many households promptly.

Furthermore, in the receiving device 20, when the EA wakeup information changes from inactive ("00") to active ("01", "10", "11"), the broadcast signal processing part (SoC) is started to present the emergency alert information. Therefore, the power is automatically turned on in a case where the user is not watching the broadcasting service (in a case where the receiving device 20 is in the standby mode) and the emergency alert information is notified via broadcasting, and the user can notice the emergency alert information promptly.

Such a function of forcibly starting the receiving device 20 that is in the standby state and presenting the emergency alert information in an emergency allows more receiving devices 20 to present the emergency alert information, but on the other hand, the receiving device 20 can be started (power of the receiving device 20 is turned on) at a timing not intended by the user. Therefore, depending on the way of operating the function, the convenience of the user can be impaired as described above.

Therefore, next, with reference to FIGS. 4 to 8, a problem in an operation assumed in the present situation (hereinafter referred to as an assumed operation) and an outline of a solution means thereof will be described.

First Example of Assumed Operation

Figure 4:
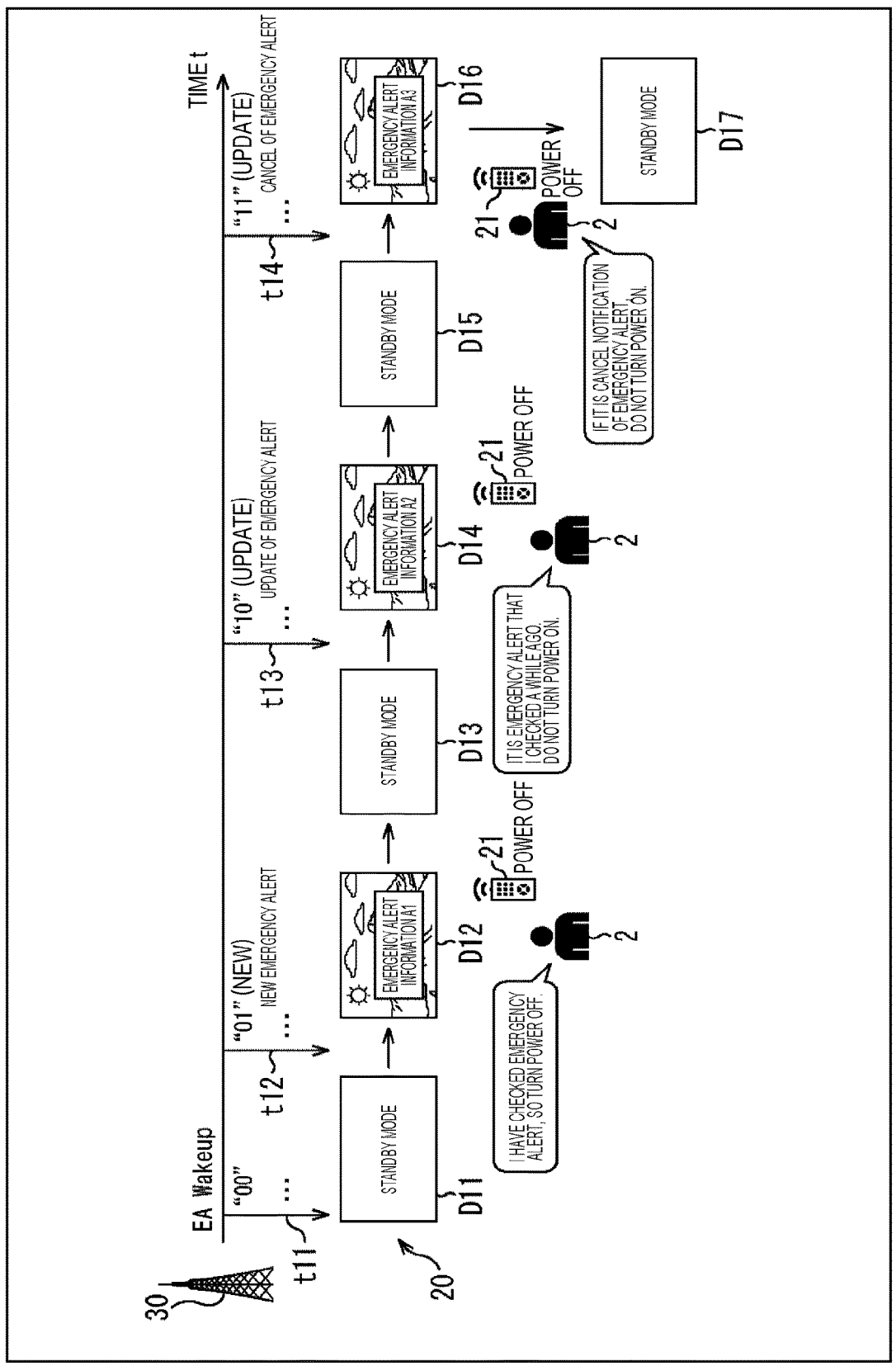
FIG. 4 is a diagram showing a first example of assumed operation.

FIG. 4 is a diagram showing a first example of the assumed operation.

FIG. 4 represents changes in the values ("00", "01", "10", "11") of the EA wakeup information (EA wakeup) included in the physical layer frame in the horizontal time series in the drawing. Furthermore, FIG. 4 schematically shows the receiving device 20 operating in the standby mode according to a change in the value of the EA wakeup information is forcibly started (automatically started) and presents the emergency alert information.

From time t11 to time t12, since EA Wakeup="00" is established, the receiving device 20 continues the standby mode and is in a state where nothing is displayed on the screen (screen D11). Thereafter, at time t12, when the value of EA Wakeup changes from "00" to "01" and a new emergency alert is distributed, the receiving device 20 in the standby mode is forcibly started (power is turned on), and the received emergency alert information A1 is displayed (screen D12).

For example, this emergency alert information A1 is information that a hurricane is approaching, and the user 2 checks the emergency alert information A1, then operates (turns off the power of) a remote controller 21, and sets the receiving device 20 to the standby mode again (screen D13).

Thereafter, at time t13, when the value of EA Wakeup changes to "10" and an updated emergency alert is distributed, the receiving device 20 in the standby mode is again forcibly started, and the received emergency alert information A2 is displayed (screen D14).

For example, this emergency alert information A2 is information that the hurricane that has been alerted has passed, and the user 2 checks the emergency alert information A2, then turns off the power, and sets the receiving device 20 to the standby mode again (screen D15). At this time, the emergency alert information A1 and the emergency alert information A2 are both information associated with the hurricane, and there is a possibility that the user 2 wants the emergency alert information A2 not to be displayed because the emergency alert that the user 2 saw earlier is repeatedly displayed.

Thereafter, at time t14, when the value of EA Wakeup changes to "11" and an updated emergency alert is distributed, the receiving device 20 in the standby mode is again forcibly started, and the received emergency alert information A3 is displayed (screen D16).

For example, this emergency alert information A3 is information that the hurricane that has been alerted has become a depression and the alert has been released, and the user 2 checks the emergency alert information A3, then turns off the power, and sets the receiving device 20 to the standby mode again (screen D17). At this time, the emergency alert information A3 is information associated with the hurricane as similar to the emergency alert information A1 and the emergency alert information A2, and there is a possibility that the user 2 wants the power of the receiving device 20 not to be turned on if it is cancel notification of the emergency alert.

As described above, in the first example of the assumed operation, the value of EA Wakeup is updated to "01", "10", "11" each time the emergency alert information A1, A2, A3 is updated, and the receiving device 20 in the standby mode is forcibly started. Therefore, the receiving device 20 is started automatically when the EA Wakeup ("01", "10", "11") indicating the active state is received, regardless of the user's intention. Then, some users feel inconvenience from such operation that the receiving device 20 is always automatically started (power is automatically turned on) when the EA Wakeup is updated.

In particular, the state as shown in FIG. 4 where, even though the user checks certain emergency alert information and turns off the power, the receiving device 20 is automatically started (power is turned on) again each time the same emergency alert information is updated may impair the convenience of the user.

For the first example of such assumed operation, for example, there are demands for the power of the receiving device 20 to be turned on and the information to be presented only when new emergency alert information is issued, for the power of the receiving device 20 to be turned on and the information to be presented only when emergency alert information is issued and when the information is updated (notification of cancellation of emergency alert information is not required), and for selecting whether updates of the emergency alert information are presented in the user interface.

In response to such a request, in the receiving device 20 to which the present technology is applied, by controlling the presentation of the emergency alert information depending on the type (for example, new, update, cancellation, or the like) thereof on the basis of the information associated with the receiving setting of the emergency alert information set by the user (hereinafter, referred to as receiving setting information), it is possible to prevent the receiving device 20 from being automatically started in a situation unintended by the user. Furthermore, by performing such control, it becomes possible for the sender of the emergency alert information to transmit the information intended by the sender without impairing the convenience of the user.

Note that FIG. 4 shows an example in which when the value of EA Wakeup is changed, the receiving device 20 is started in response to the change, but since the EA wakeup information is transmitted periodically, depending on the implementation, for example, the following operations are also assumed. In other words, a scene is also assumed in which, in a case where EA Wakeup="01" is received as the EA wakeup information, and the user 2 turns off the power after the receiving device 20 automatically starts, when EA wakeup information being transmitted in accordance with a carousel scheme is Wakeup="01", the receiving device 20 that receives the information automatically starts again.

Second Example of Assumed Operation

Figure 5:
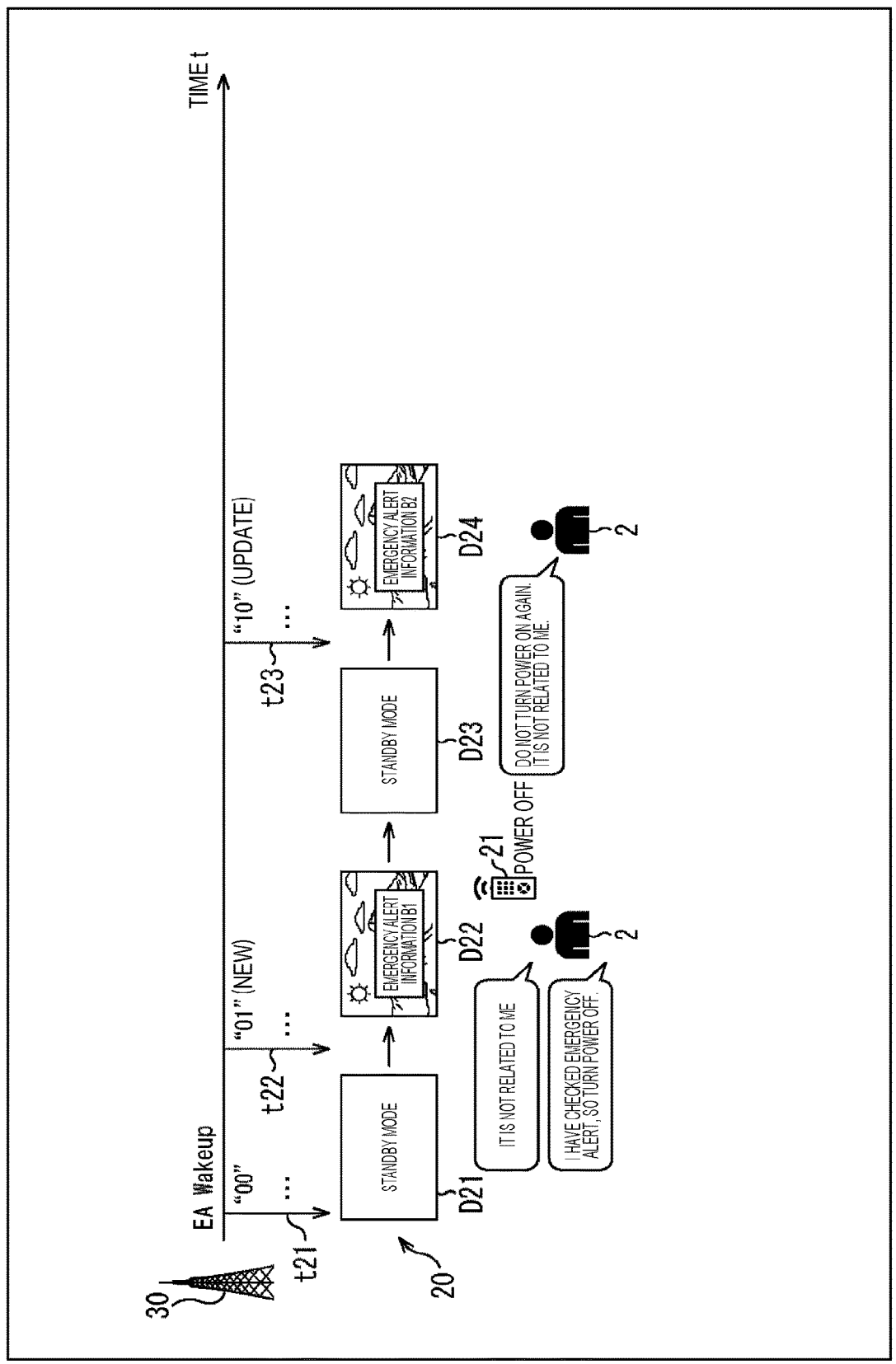
FIG. 5 is a diagram showing a second example of assumed operation.

FIG. 5 is a diagram showing a second example of the assumed operation.

FIG. 5 illustrates, as similar to FIG. 4, a situation where the receiving device 20 operating in the standby mode is forcibly started in response to a change in the value of the EA wakeup information and presents emergency alert information.

From time t21 to time t22, since EA Wakeup="00" is established, the receiving device 20 continues the standby mode and is in a state where nothing is displayed on the screen (screen D21). Thereafter, at time t22, when the value of EA Wakeup changes from "00" to "01" and a new emergency alert is distributed, the receiving device 20 in the standby mode is forcibly started (power is turned on), and received emergency alert information B1 is displayed (screen D22).

For example, this emergency alert information B1 is information associated with the hurricane, but since the home area of the user 2 is not in the course of the hurricane, the user 2 checks the emergency alert information B1 and then operates the remote controller 21 to set the receiving device 20 to the standby mode again (screen D23).

At this time, although the home area of the user 2 is not in the course of the hurricane, since the emergency alert is issued in a wide area, the emergency alert information B1 is displayed also on the receiving device 20 installed in the area outside the course, but there is a possibility that the user 2 wants the emergency alert information B1 unrelated to himself/herself not to be displayed.

Thereafter, at time t23, when the value of EA Wakeup changes to "10" and an updated emergency alert is distributed, the receiving device 20 in the standby mode is again forcibly started, and the received emergency alert information B2 is displayed (screen D24).

For example, the emergency alert information B2 is subsequent information associated with the hurricane, and there is a possibility that the user 2 wants the power of the receiving device 20 not to be turned on if the information is not relevant to the user 2.

As described above, in the second example of the assumed operation, when the EA Wakeup ("01", "10", "11") indicating the active state is received, the receiving device 20 is forcibly started regardless of the user's intention. Then, it is conceived that the operation of starting of the receiving device 20 always performed at the time of updating the EA Wakeup, for example, even if the information has little relevance to the user or the information that is not of interest to the user as the emergency alert information impairs the convenience of the user. Furthermore, in the receiving device 20, while a certain emergency alert information is updated, the operation of changing the state from the standby state to the started state occurs repeatedly even though the user checks the emergency alert information and turns off the power.

In response to such a request, in the receiving device 20 to which the present technology is applied, by controlling the presentation of the emergency alert information on the basis of the receiving setting information, according to the type of the receiver, the priority of the emergency alert information, the relevant area, the event type, or the like, it is possible to prevent the receiving device 20 from being automatically started in a situation unintended by the user.

Third Example of Assumed Operation

Figure 6:
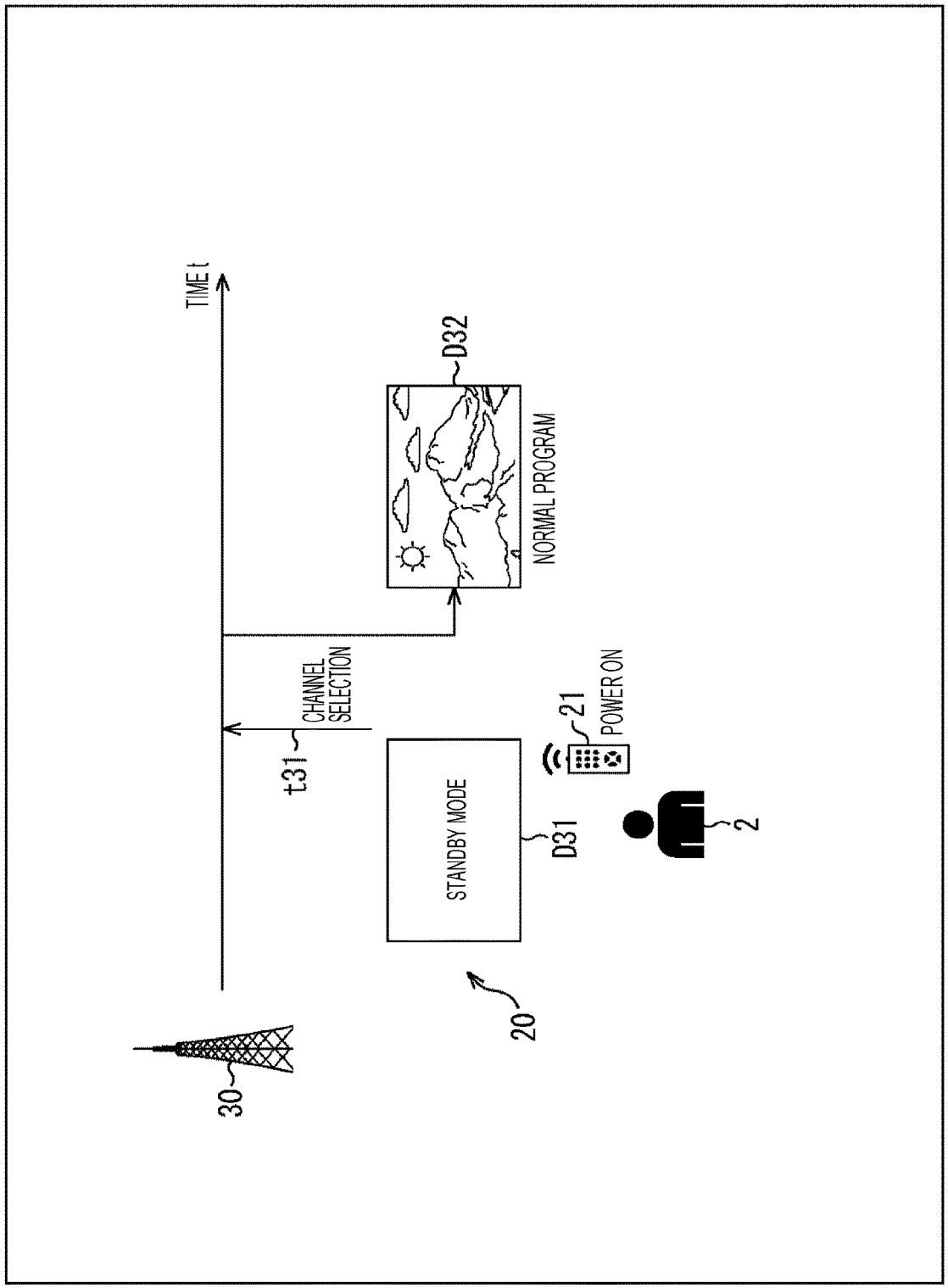
FIG. 6 is a diagram showing a third example of assumed operation.
Figure 7:
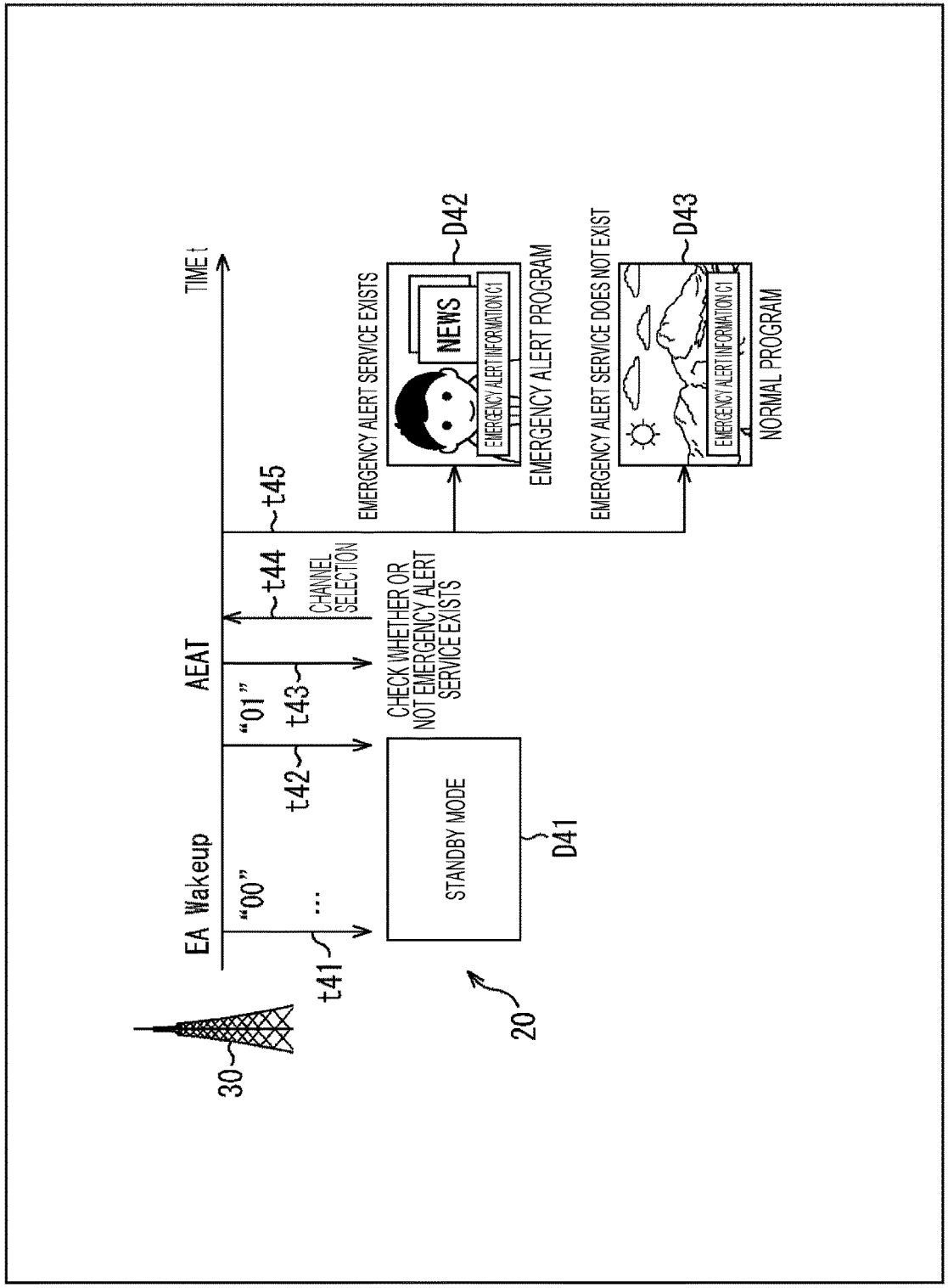
FIG. 7 is a diagram showing the third example of assumed operation.

FIGS. 6 and 7 are diagrams showing a third example of the assumed operation.

FIGS. 6 and 7 illustrate, as similar to FIG. 4 and the like, a situation of the operation of the receiving device 20 operating in the standby mode.

Here, in the receiving device 20 in the standby mode, it is assumed that the system-on-chip (SoC) on standby performs the following two operations. In other words, as the first operation, operation is assumed where the system-on-chip (SoC) on standby is started (power is turned on) by, for example, the user operating the remote controller or setting the timer for the viewing reservation, and processing related to the broadcasting service is performed. Furthermore, as the second operation, operation is assumed where the system-on-chip (SoC) on standby is started (power is turned on) at the time of updating the EA Wakeup, and processing related to an emergency alert is performed.

In the case of the former operation, in order to receive the broadcasting service, in the receiving device 20, processing for selecting the channel (so-called last channel) received when the power was turned off last time, and presenting the broadcast program of the selected channel is required.

Specifically, as shown in FIG. 6, at time t31, in a case where the user 2 operates the remote controller 21 (turns on the power) to turn on the power of the receiving device 20 in the standby mode, the normal program of the last channel is displayed on the screen (screen D32).

On the other hand, in a case of the latter operation, in the receiving device 20, in presenting the emergency alert information, processing for selecting the emergency alert service and presenting the selected emergency alert program is required in a case where the emergency alert service exists, and processing for selecting the broadcasting service and presenting the selected broadcast program is required in a case where the emergency alert service does not exist.

Specifically, as shown in FIG. 7, from time t41 to time t42, since EA Wakeup="00" is established, the receiving device 20 continues the standby mode and is in a state where nothing is displayed on the screen (screen D41). Thereafter, at time t42, when the value of EA Wakeup changes from "00" to "01" and a new emergency alert is distributed, in the receiving device 20 in the standby mode, the power is forcibly turned on, and it is checked whether or not the metadata including the emergency alert information (for example, AEAT metadata) includes the information associated with the emergency alert service (time t43). Note that the details of the AEAT metadata will be described later with reference to FIGS. 14, 15 and the like.

Then, in the receiving device 20, in a case where an emergency alert service exists, the channel of the emergency alert service is selected from time t44 to time t45, and the screen displays the emergency alert program corresponding to the emergency alert information C1 (screen D42). On the other hand, in the receiving device 20, in a case where an emergency alert service does not exist, the channel of the broadcasting service (last channel) is selected from time t44 to time t45, and the screen displays the emergency alert information C1 and a normal program (screen D43).

As described above, in the third example of the assumed operation, the expected operation after the power of the receiving device 20 in the standby mode is turned on is different in a case where the user 2 operates the remote controller 21 (turns on the power) or sets the timer for viewing reservation, and in a case where the value of the EA wakeup information changes. That is, in the receiving device 20, the expected operation after start differs depending on the start factor in the standby mode. Therefore, there is a demand for coping with such a difference in expected operation.

In response to such a demand, the receiving device 20 to which the present technology is applied is configured to operate by distinguishing between the normal start mode and the emergency alert priority mode, so that the post-start operation expected depending on the start factor in the standby mode is performed.

Note that, here, the operation of the user 2 operating the remote controller 21, setting a timer for viewing reservation, or the like to start (turn on the power of) the receiving device 20 (the broadcast signal processing part (SoC) thereof) that operates in the standby mode to receive the broadcasting service as shown in FIG. 6 is defined as the normal start mode.

On the other hand, the operation of starting (turning the power on) the receiving device 20 (broadcast signal processing part (SoC) thereof) that operates in the standby mode by the EA wakeup information extracted from the bootstrap of the physical layer frame, and receiving the emergency alert information as shown in FIG. 7 is defined as the emergency alert priority mode.

By defining such modes, the receiving device 20 to which the present technology is applied is configured to operate in the normal start mode to receive the broadcast service in a case of being started by the operation of the remote controller 21 by the user 2 and the like in the standby mode, and operate in the emergency alert priority mode to receive the emergency alert information in a case of being started by the EA wakeup information.

Furthermore, the receiving device 20 to which the present technology is applied is configured to control the presentation of emergency alert information on the basis of information associated with the emergency alert information received in the past (hereinafter, referred to as history information) in addition to the receiving setting information set by the user, in a case of operating in the emergency alert priority mode.

Fourth Example of Assumed Operation

Figure 8:
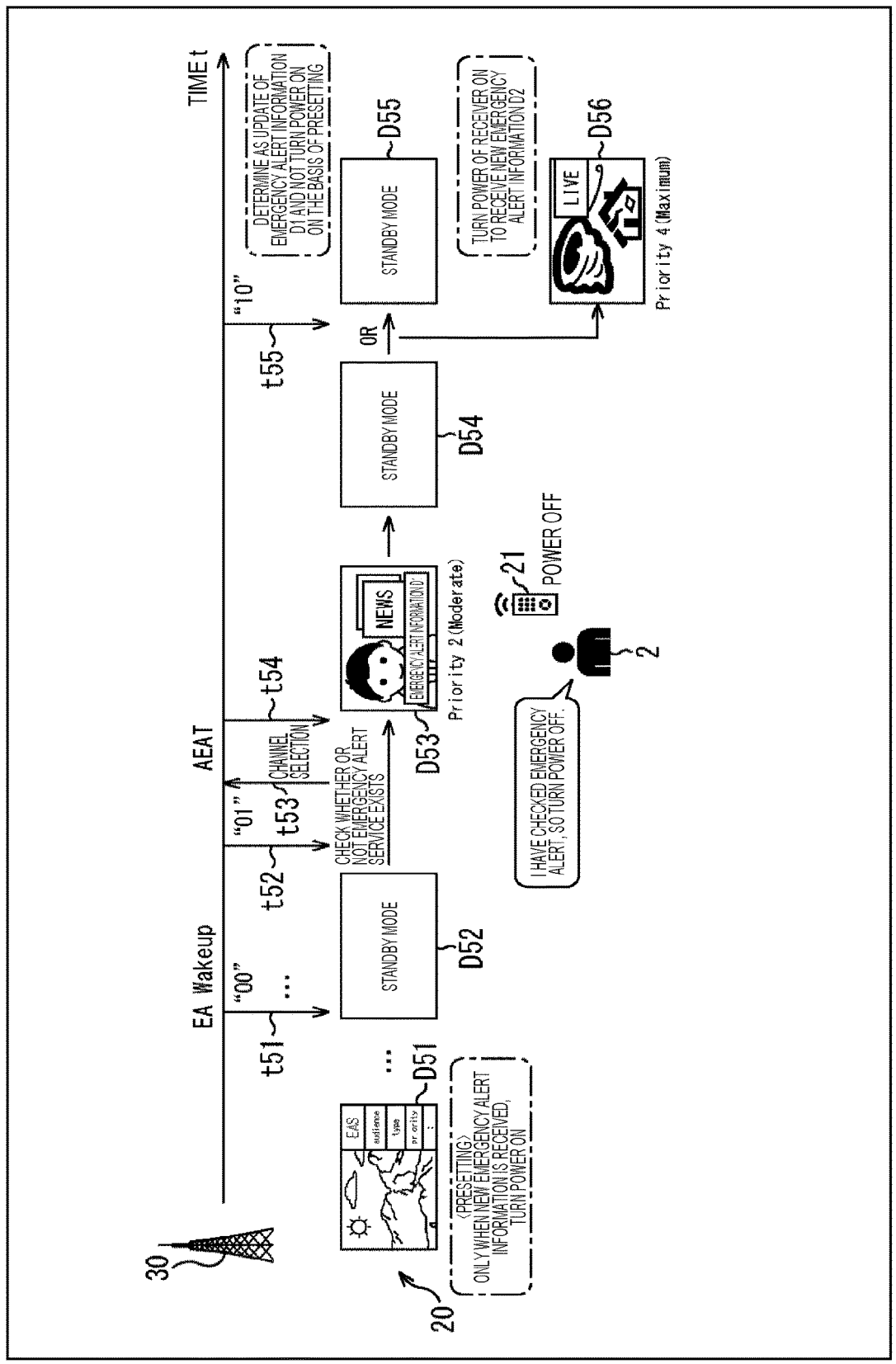
FIG. 8 is a diagram showing a fourth example of assumed operation.

FIG. 8 is a diagram showing a fourth example of the assumed operation.

FIG. 8 illustrates, as similar to FIG. 4 and the like, a situation where the receiving device 20 operating in the standby mode is forcibly started in response to a change in the value of the EA wakeup information and presents emergency alert information.

Here, in the fourth example of the assumed operation, as a preset of the receiving device 20, a setting to turn on the power only when new emergency alert information is received is made, and is recorded as the receiving setting information (screen D51). Note that the details of the preset setting of the receiving setting information will be described later with reference to FIGS. 24, 25 and the like.

From time t51 to time t52, since EA Wakeup="00" is established, the receiving device 20 continues the standby mode and is in a state where nothing is displayed on the screen (screen D52). Thereafter, at time t52, when the value of EA Wakeup changes from "00" to "01" and a new emergency alert (emergency alert information D1) is distributed, the receiving device 20 in the standby mode receives metadata (for example, AEAT metadata) including the emergency alert information D1 to check whether or not the emergency alert service exists.

Then, in the receiving device 20, in a case where there is an emergency alert service, the channel of the emergency alert service is selected from time t53 to time t54, and the screen displays the emergency alert program corresponding to the emergency alert information D1 (screen D53). After checking the emergency alert program, the user 2 operates the remote controller 21 to set the receiving device 20 to the standby mode again (screen D54).

Thereafter, at time t55, when the value of EA Wakeup changes to "10", the receiving device 20 in the standby mode is assumed to perform the following two operations on the basis of the type of the emergency alert information included in the received metadata (for example, AEAT metadata).

In other words, the first is operation of determining that the received emergency alert information is an update of the emergency alert information D1, and maintaining the standby mode without starting the receiving device 20 in the standby mode on the basis of the presetting, and the second is operation of determining that the received emergency alert information is new emergency alert information D2 and starting the receiving device 20 in the standby mode to display an emergency alert program or the like.

Specifically, as shown in FIG. 8, in the case of the former operation, the receiving device 20 continues the standby mode and is in a state where nothing is displayed on the screen (screen D55). On the other hand, in the latter case, the receiving device 20 receives the new emergency alert information D2, and in a case where there is an emergency alert service, the channel of the emergency alert service is selected, and the screen displays the emergency alert program (screen D56).

As described above, in the fourth example of the assumed operation, '00' indicating the inactive state and "01", "10", "11" indicating the active state are defined as the value of EA Wakeup, and in a case where the emergency alert information is updated, the value changes from "01" to "10", and further changes from "10" to "11" (assuming that "11" is looped to "01") so that the system-on-chip will be notified of the update.

In this case, if there is only one piece of emergency alert information, it is possible to notify the system-on-chip that there are new emergency alert information and an update of the emergency alert information, but in a case where a plurality of pieces of emergency alert information occurs at the same time, since it is not possible to notify the system-on-chip which emergency alert information is new or updated, it is demanded that the system-on-chip side identifies the emergency alert information and determines whether to start.

In response to such a demand, the receiving device 20 to which the present technology is applied is configured to identify the series of emergency alert information on the basis of the identification information (aeaId, refAEAId) included in the metadata including the emergency alert information (for example, AEAT metadata), and for the emergency alert information of the same series, determine whether to automatically start or maintain the standby mode on the basis of the type information (aeaType) indicating the new, update, or cancellation included in the emergency alert information and the receiving setting information. Note that the details of the AEAT metadata will be described later with reference to FIGS. 14, 15 and the like.

Therefore, for example, operation of the receiving device 20 such as whether or not to enable the function of automatically starting the receiving device 20 according to the content of the emergency alert information, whether or not to check the emergency alert information once checked is updated, or whether or not to automatically start when the emergency alert information is cancelled can be determined on the basis of the user's selection.

The problems in the assumed operation and the outline of the means for solving the problems have been described above. Next, more detailed contents will be described with reference to FIGS. 9 to 25.

(Physical Layer Frame Configuration)

The physical layer frame to which the present technology is applied can include, for example, a bootstrap, a preamble, and one or more subframes.

The physical layer frame has a predetermined frame length such as millisecond. In processing the physical layer frame, the receiving device 20 can acquire the bootstrap and the preamble, and then acquire the subsequent subframe.

Figure 9:
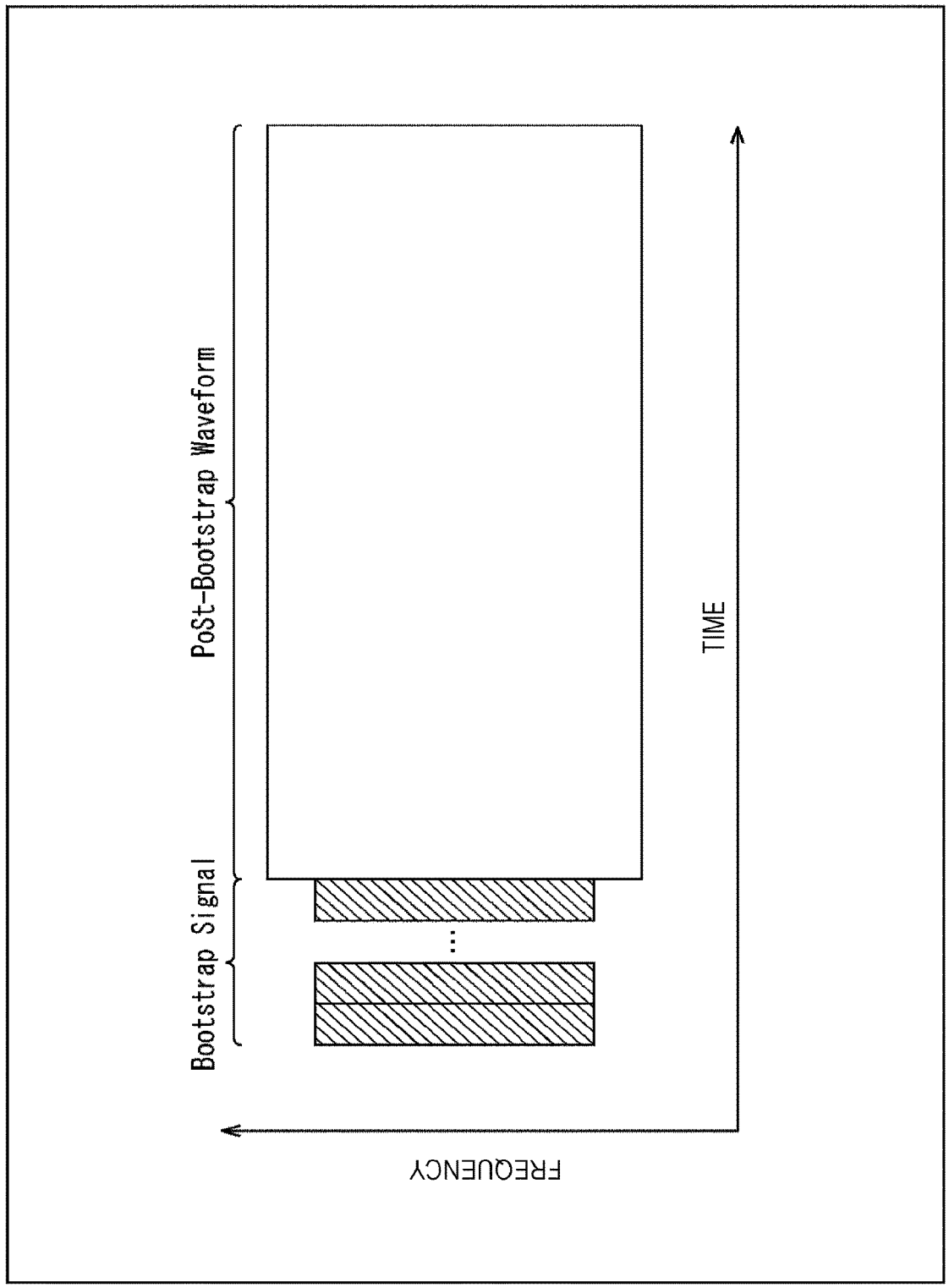
FIG. 9 is a diagram showing an example of a bootstrap configuration.

FIG. 9 shows an example of a bootstrap configuration. In FIG. 9, the horizontal direction represents time and the vertical direction represents frequency.

In FIG. 9, the bootstrap includes a bootstrap signal and a post-bootstrap waveform. A plurality of bootstrap symbols is arranged in the field of the bootstrap signal. For example, as the bootstrap symbol, Bootstrap Symbol 1 in FIG. 10 and Bootstrap Symbol 2 in FIG. 11 are arranged.

FIG. 10 shows an example of syntax of Bootstrap Symbol 1. This Bootstrap Symbol 1 includes a 1-bit ea_wake_up_1 field. ea_wake_up_1 is a bit for starting the receiving device 20 in response to an emergency alert.

FIG. 11 shows an example of syntax of Bootstrap Symbol 2. This Bootstrap Symbol 2 includes a 1-bit ea_wake_up_2 field. ea_wake_up_2 is a bit for starting the receiving device 20 in response to an emergency alert.

As described above, 1 bit of ea_wake_up_1 of Bootstrap Symbol 1 in FIG. 10 and 1 bit of ea_wake_up_2 of Bootstrap Symbol 2 in FIG. 11 are bits for starting the receiving device 20 and 2 bits of combination of these bits compose the EA wakeup information (the bits thereof) as shown in FIG. 2 described above. Furthermore, as the meaning of the bits of the EA wakeup information, four meanings of "00", "01", "10", and "11" can be given as shown in FIG. 3 described above.

Note that, in the physical layer frame defined by ATSC3.0, the preamble includes L1 signaling (physical layer signaling) such as L1-Basic signaling or L1-Detail signaling. Furthermore, a payload (data) is arranged in the subframe. In a case where the physical layer frame includes two or more subframes, modulation parameters such as the FFT size and guard interval (GI) length can be changed for each subframe.

Furthermore, in the physical layer frame defined by the ATSC3.0, the bootstrap corresponds to the P1 symbol forming the T2 frame defined by the digital video broadcasting-terrestrial 2 (DVB-T2). Furthermore, the preamble corresponds to the P2 symbol that composes the T2 frame. Accordingly, the bootstrap can also be said to be a preamble signal.

Note that details of Bootstrap Symbol 1 and Bootstrap Symbol 2 are described in "6. BOOTSTRAP SIGNAL STRUCTURE" in Non-Patent Document 1 below. Furthermore, details of the meaning of the value of the 2-bit Wake-up bit are described in "Annex G: Emergency Alert Signaling" in Non-Patent Document 2 below.

Non-Patent Document 1: ATSC Standard: A/321, System Discovery and Signaling

Non-Patent Document 2: ATSC Candidate Standard: Signaling, Delivery, Synchronization, and Error Protection (A/331)

Example of Protocol Stack

FIG. 12 is a diagram showing an example of a protocol stack of an IP transmission system to which the present technology is applied.

In FIG. 12, the lowest layer is a physical layer. For example, in IP transmission digital broadcasting such as the ATSC3.0, there is not only transmission using unidirectional broadcasting but also transmission of part of data using bidirectional communication in some cases.

In a case of using broadcasting, the physical layer corresponds to the frequency band or the like of the broadcast wave allocated for the service (channel).

The upper layer of the physical layer is a link layer protocol layer. Furthermore, the upper layers of the link layer protocol layer are an Internet protocol (IP) layer and a user datagram protocol (UDP) layer. The IP layer and the UDP layer are layers corresponding to the network layer and the transport layer in the hierarchical model of communication, and the IP packet and the UDP packet are specified by the IP address and the port number.

Here, low level signaling (LLS) and service layer signaling (SLS) can be used as upper layer signaling (control information). The LLS is signaling transmitted in a layer lower than the SLS. The SLS is signaling on a service-by-service basis. In other words, in the protocol stack to which the present technology is applied, upper layer signaling is transmitted in two lyers of the LLS and the SLS.

The LLS includes metadata such as service list table (SLT), advanced emergency alert table (AEAT), and region rating table (RRT).

The SLT metadata includes basic information indicating the configuration of streams and broadcasting services in the broadcasting network, such as information necessary for selecting a broadcasting service (channel). The AEAT metadata includes information associated with emergency alert information, which is information that needs to be announced urgently. The SLT metadata and the AEAT metadata are transmitted by being included in UDP/IP packets which are IP packets including UDP packets.

The upper layer adjacent to the IP layer and the UDP layer is called real-time object delivery over unidirectional transport (ROUTE). The ROUTE is a protocol for streaming file transfer, and is an extension of file delivery over unidirectional transport (FLUTE).

Through this ROUTE session, an SLS file (signaling), a non real time (NRT) content file (NRT), a DASH segment file (DASH) and the like are transmitted for each broadcasting service.

Here, the SLS is service level signaling, and provides information, attributes, and the like necessary for searching and selecting a component (for example, video, audio, subtitles, or the like) belonging to a target broadcasting service. The SLS includes metadata such as user service bundle description (USBD), service-based transport session instance description (S-TSID), and media presentation description (MPD). Furthermore, the NRT content is content acquired via broadcasting, and includes, for example, an application.

Note that, although a detailed description is omitted, as a media transport method, an MPEG media transport (MMT) protocol can be used instead of the ROUTE protocol.

On the other hand, in a case of using bidirectional communication (broadband), the upper layer of the physical layer is a data link layer. Furthermore, the upper layer of the data link layer is the IP layer corresponding to the network layer. The upper layer adjacent to the IP layer is a transmission control protocol (TCP) layer corresponding to the transport layer, and moreover, the upper layer adjacent to the TCP layer is a hypertext transfer protocol (HTTP) layer corresponding to the application layer.

In other words, in a case of using communication, these layers implement a protocol such as TCP/IP operating on a communication line such as the Internet.

Among the upper layers adjacent to the HTTP layer, some of the upper layers are signaling and NRT content (NRT). This signaling (control information) includes all signaling (control information) such as the signaling transmitted in the ROUTE session described above. Furthermore, the NRT content is content acquired via communication and includes, for example, an application.

Among the upper layers adjacent to the HTTP layer, layers other than the above-described layers are DASH segments (DASH). In other words, in bidirectional communication streaming distribution, the stream data of components (for example, video, audio, subtitles, or the like) included in content such as video on demand (VOD) programs is transmitted in DASH segment units conforming to the ISO BMFF standard.

As described above, in the protocol stack of the IP transmission system to which the present technology is applied, the unidirectional broadcasting system layer and a part of the bidirectional communication system layer are common protocols, and it is possible to transmit the stream data of the components (for example, video, audio, subtitles, or the like) included in the content in DASH segment units conforming to the ISO BMFF standard by the unidirectional broadcasting and the bidirectional communication.

Therefore, since the protocol of the upper layer is common in a case of performing both unidirectional broadcast streaming distribution and bidirectional communication streaming distribution, it is possible to reduce the burden of implementation and processing in each device included in the transmission system 1.

(LLS Packet Structure)

FIG. 13 is a diagram showing an example of syntax of an LLS table.

In the LLS table of FIG. 13, LLS_table_id, LLS_group_id, group_count_minus1, LLS_table_version are included in the LLS header of the packet including LLS (LLS packet).

8-bit LLS_table_id indicates an ID for identifying the LLS table. 8-bit LLS_group_id indicates an ID for identifying a group to which LLS belongs. 8-bit LLS_table_version indicates the version of the LLS table.

Furthermore, the switch statement indicates that SLT metadata is arranged as LLS data in a case where "0x01" is specified as the LLS table ID. Furthermore, the switch statement indicates that, in a case where "0x02" is specified as the LLS table ID, RRT metadata is arranged as LLS data, and in a case where "0x03" is specified, system time is set as LLS data. Moreover, the switch statement indicates that AEAT metadata is arranged as LLS data in a case where "0x04" is specified as the LLS table ID.

In other words, the physical layer frame (L1 Frame) includes L1 header and L1 payload, and this L1 header (for example, bootstrap) includes EA wake-up information (EA wake) for starting the receiving device 20 in standby mode in an emergency. Furthermore, a plurality of transmission packets (for example, ATSC link-layer protocol (ALP) packets) is arranged in the L1 payload.

This transmission packet is a layer-2 layer (L2) packet, and an LLS table is arranged in its payload. In other words, since the LLS table is transmitted by being included in the UDP/IP packet, the IP header and the UDP header are added as the header in addition to the LLS header. Furthermore, LLS data, in other words, AEAT metadata and the like are arranged in the LLS table.

(AEAT Metadata Structure)

FIGS. 14 and 15 are diagrams showing examples of the syntax of AEAT metadata in the extensible markup language (XML) format.

Note that, in FIGS. 14 and 15, among the element and attribute, the attribute is attached with "@". Furthermore, the indented element and attribute are specified for their upper element.

As shown in FIG. 14, the AEAT element as the root element includes one or more AEA elements. The AEA element is an upper element of the aeaId attribute, issuer attribute, audience attribute, aeaType attribute, refAEAId attribute, priority attribute, wakeup attribute, Header element, AEAText element, LiveMedia element, and Media element.

The aeaId attribute specifies an ID that identifies an AEA message. The issuer attribute specifies the issuer of the AEA message. The audience attribute specifies the audience of the AEA message.

The aeaType attribute specifies the category of AEA message. The refAEAId attribute specifies the ID that identifies the AEA message referenced by the ID indicated by the aeaId attribute.

The priority attribute specifies the priority of the AEA message. The wakeup attribute specifies whether to associate the AEA message with the ea_wake_up_bit.

The Header element is an upper element of the effective attribute, expires attribute, EventCode element, EventDesc element, and Location element.

The effective attribute specifies the date and time when the AEA message becomes effective. The expires attribute specifies the date and time when the AEA message expires.

The EventCode element specifies the event type of the AEA message. The type attribute specifies the domain of the event code assigned to each country.

The EventDesc element specifies a short textual information description of the emergency alert event. The lang attribute specifies the language of the description by the EventDesc element.

The Location element specifies the geographical code of the target area of the AEA message. The type attribute specifies the domain of the code.

The AEAText element specifies text information of the AEA message. In a case of using AEAT metadata, this AEA message corresponds to emergency alert information. The lang attribute specifies the language of the text information of AEA message.

The LiveMedia element includes information for identifying broadcast distribution that can be presented to the user as an option of related information of emergency alert information. In a case of using AEAT metadata, it is possible to determine whether or not an emergency alert service exists on the basis of the description content of this LiveMedia element, and select an emergency alert program to be broadcast live.

The bsid attribute and serviceId attribute specify a broadcast stream ID and a service ID for identifying an emergency alert program to be broadcast live. The ServiceName element specifies the name of the emergency alert program to be broadcast live. The lang attribute specifies the language of the service name.

The Media element includes the component parts of the multimedia resource. The lang attribute specifies the language of the media resource. The mediaDesc attribute specifies a description of the content of the media resource. The mediaType attribute specifies the intended use of the associated media.

The url attribute specifies the URL of the media file. The alternateUrl attribute specifies the URL of a media file in a case where the media file can be used even via communication. The contentType attribute specifies the media type assigned by the Internet Assigned Numbers Authority (IRNA).

The contentLength attribute specifies the size of media in byte units. The mediaAssoc attribute specifies the URI of another media element with which this attribute is associated.

Note that, in FIGS. 14 and 15, in a case where, although it is the number of appearances (Use), "1" is specified, only one element or attribute is always specified, and in a case where "0 . . . 1" is specified, it is optional to specify the element or attribute. Furthermore, in a case where "1 . . . n" is specified, one or more elements or attributes are specified. In a case where "0 . . . n" is specified, it is optional to specify one or more elements or attributes.

Furthermore, in a case where "string" is specified as the Data Type, it indicates that the value of the element or attribute is a string type, and in a case where "unsignedByte" is specified, it indicates that the value of the element or attribute is unsignedByte type. Moreover, in a case where "boolean" is specified as the Data Type, it indicates that it is a boolean type, and in a case where "date Time" is specified, it indicates that it is a date and time type.

Moreover, in a case where "fang" is specified as the Data Type, it indicates that it is a language type, and in a case where "anyURI" is specified, it indicates that it is anyURI data type. Furthermore, in a case where "unsignedShort" and "unsignedLong" are specified as the Data Type, it indicates that they are unsignedShort type and unsignedLong type, respectively.

Note that the syntax of the AEAT metadata shown in FIGS. 14 and 15 is an example, and other syntaxes such as adding other elements and attributes may be adopted, for example. Furthermore, the AEAT metadata is not limited to the XML format and may be described in another markup language or may be in the section format.

Furthermore, the details of the AEAT metadata are described in "6.5 Advanced Emergency Alert Table" of Non-Patent Document 2 described above.

(Configuration of Receiving Device)

Figure 16:
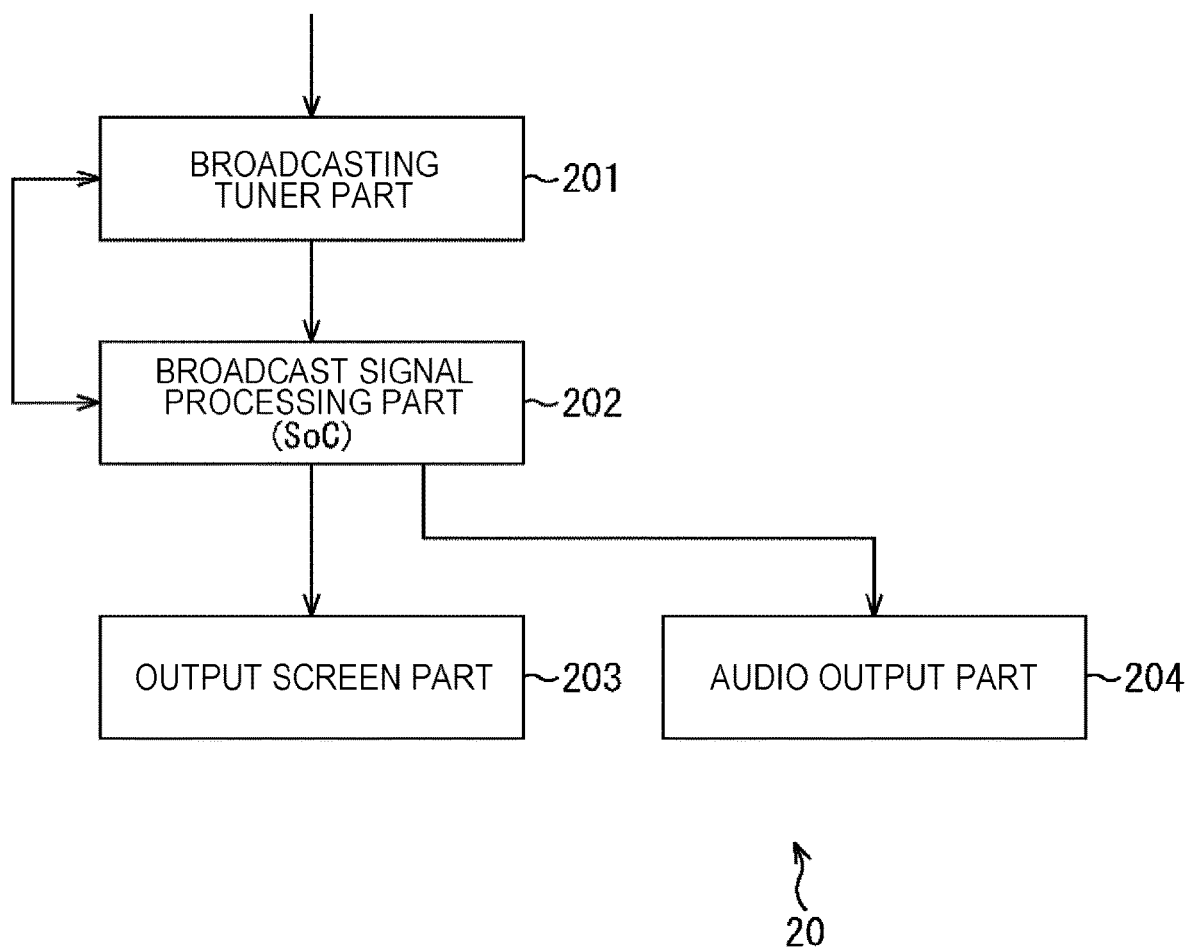
FIG. 16 is a diagram showing an example of a configuration of a receiving device to which the present technology is applied.

FIG. 16 is a diagram showing an example of a configuration of a receiving device to which the present technology is applied.

In FIG. 16, the receiving device 20 includes a broadcasting tuner part 201, a broadcast signal processing part 202, an output screen part 203, and an audio output part 204.

The broadcasting tuner part 201 is a receiving part including a tuner module, a demodulation LSI, and the like, for example. The broadcasting tuner part 201 receives a broadcast signal input via a receiving antenna (not shown), performs processing related to a physical layer frame acquired from the broadcast signal (for example, demodulation processing, error correction processing, or the like), and supplies the broadcast stream (broadcast data packet) acquired as a result of the processing to the broadcast signal processing part 202. Note that, as the broadcast data packet, for example, a transmission packet such as an ALP packet, a UDP/IP packet, or the like can be used.

The broadcast signal processing part 202 is, for example, a processing part configured as a system-on-chip (SoC) or the like. The broadcast signal processing part 202 processes the broadcast stream (broadcast data packet) supplied from the broadcasting tuner part 201, and performs decoding or the like of video, audio, and subtitle data included in the stream corresponding to the selected broadcast program. The broadcast signal processing part 202 supplies, of the data obtained as a result of the processing, video and subtitle data to the output screen part 203, and audio data to the audio output part 204.

The output screen part 203 is configured as a display device such as a liquid crystal display or an organic EL display, for example. The output screen part 203 displays the video and subtitles of the broadcast program on the basis of the video and subtitle data supplied from the broadcast signal processing part 202.

The audio output part 204 is configured as, for example, a speaker or the like. The audio output part 204 outputs audio synchronized with the video of the broadcast program, on the basis of the audio data supplied from the broadcast signal processing part 202.

Here, the broadcast signal processing part 202 is configured as a chip different from the broadcasting tuner part 201, and is connected via a predetermined interface. In the receiving device 20 that operates in the standby mode, the broadcasting tuner part 201 is started and operating, but the broadcast signal processing part 202, the output screen part 203, and the audio output part 204 are not operating (power is not supplied). Note that, although illustration is omitted in the configuration shown in FIG. 16, the receiving device 20 is provided with a power management part for controlling electric power supplied to each part, and power is supplied to the broadcasting tuner part 201, the broadcast signal processing part 202, and the like according to an operation mode.

In the receiving device 20 that operates in the standby mode, the broadcasting tuner part 201 instructs the broadcast signal processing part 202 to start on the basis of the EA wakeup information acquired from the physical layer frame (bootstrap thereof). On the other hand, the broadcast signal processing part 202 controls the presentation of the emergency alert information on the basis of the AEAT metadata, the receiving setting information, and the like in a case where the start instruction is given from the broadcasting tuner part 201. Furthermore, the broadcast signal processing part 202 can perform tuner control such as frequency setting on the broadcasting tuner part 201. Note that the detailed configuration of the broadcast signal processing part 202 will be described later with reference to the block diagram of FIG. 17.

(Configuration of Broadcast Signal Processing Part)

Figure 17:
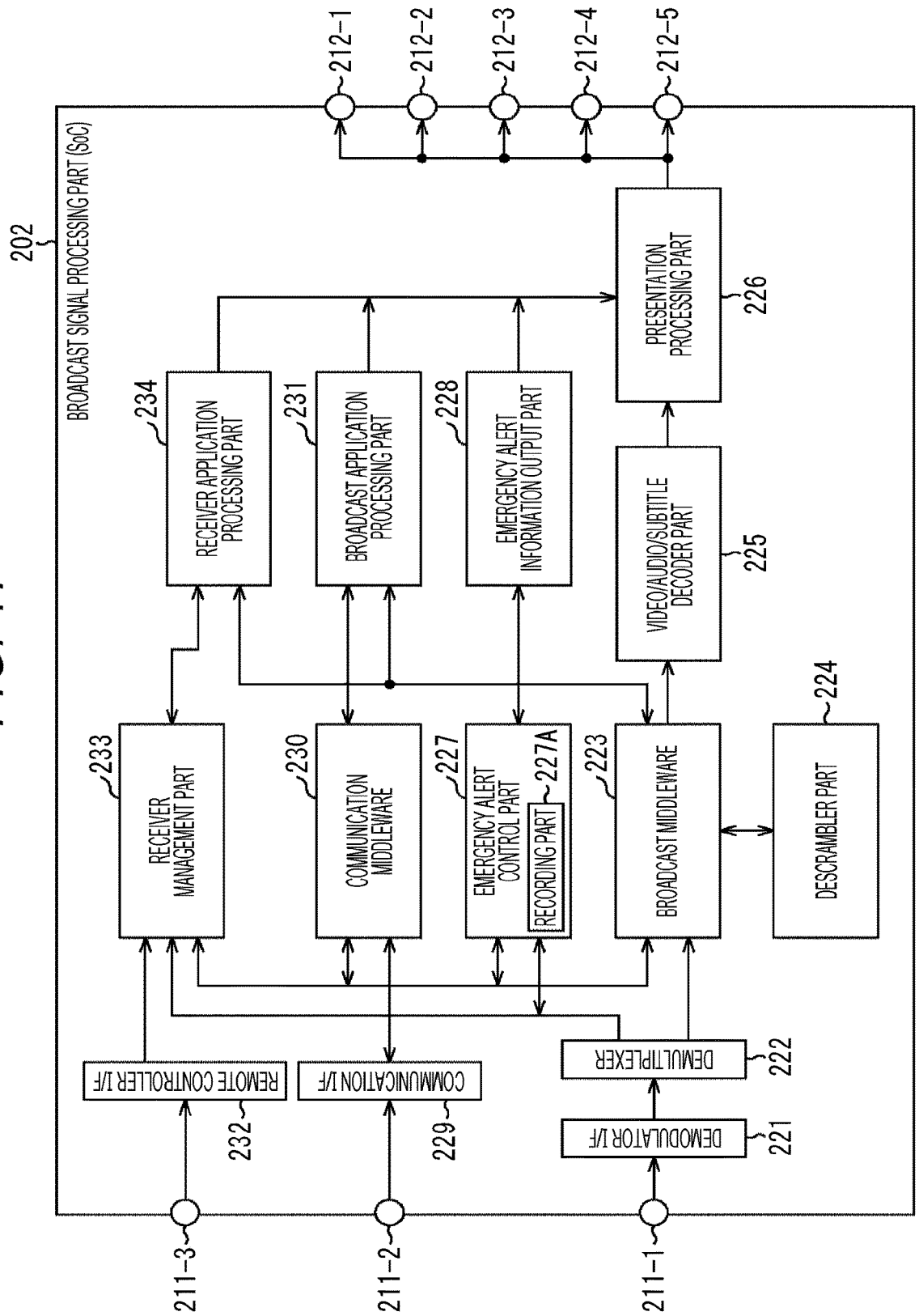
FIG. 17 is a diagram showing an example of a detailed configuration of a broadcast signal processing part (SoC) to which the present technology is applied.

FIG. 17 is a diagram showing an example of a detailed configuration of a broadcast signal processing part (SoC) to which the present technology is applied.

In FIG. 17, the broadcast signal processing part 202 includes a demodulator I/F 221, a demultiplexer 222, a broadcast middleware 223, a descrambler part 224, a video/audio/subtitle decoder part 225, a presentation processing part 226, an emergency alert control part 227, an emergency alert information output part 228, a communication I/F 229, a communication middleware 230, a broadcast application processing part 231, a remote controller I/F 232, a receiver management part 233, and a receiver application processing part 234.

The demodulator I/F 221 is an interface with the broadcasting tuner part 201 (the demodulator thereof), and supplies the broadcast stream (broadcast data packet) input via the input terminal 211-1 to the demultiplexer 222.

The demultiplexer 222 separates the broadcast stream (broadcast data packet) supplied from the demodulator I/F 221 into a plurality of streams, and supplies the resulting stream to the broadcast middleware 223, the emergency alert control part 227, or the receiver management part 233.

The broadcast middleware 223 processes the stream supplied from the demultiplexer 222 and supplies the resulting data to the video/audio/subtitle decoder part 225, the emergency alert control part 227, the broadcast application processing part 231, or the receiver application processing part 234.

In a case where the stream input to the broadcast middleware 223 is encrypted (scrambled), the descrambler part 224 decrypts (descramble) the stream for decrypting the stream using a predetermined key to restore the original state.

The video/audio/subtitle decoder part 225 decodes the encoded stream supplied from the broadcast middleware 223, and supplies the resulting data to the presentation processing part 226. Here, for example, the encoded stream includes a stream of a component (for example, video, audio, subtitles, or the like) of the selected broadcast program, and the stream is decoded.

The presentation processing part 226 performs presentation processing for presenting the data supplied from the video/audio/subtitle decoder part 225 to the output screen part 203 or the audio output part 204, and outputs the resulting presentation data to the output screen part 203 or the audio output part 204 via an output terminal 212.

For example, the presentation processing part 226 performs presentation processing on the video data and the subtitle data, and outputs the resulting presentation data to the output screen part 203 via a video output terminal 212-1 and a subtitle output terminal 212-3. Furthermore, for example, the presentation processing part 226 performs presentation processing on the audio data, and outputs the resulting presentation data to the audio output part 204 via an audio output terminal 212-2.

The emergency alert control part 227 performs control related to the emergency alert on the basis of the AEAT metadata (including emergency alert information) supplied from the broadcast middleware 223, the receiving setting information related to the receiving setting of the emergency alert information set by the user, and the like. In a case of determining that the emergency alert information is to be output, the emergency alert control part 227 supplies the emergency alert information to the emergency alert information output part 228.

The emergency alert control part 227 includes a recording part 227A such as a non-volatile memory. The recording part 227A records the receiving setting information according to the result of the receiving setting input of the emergency alert information from the receiver management part 233. Furthermore, the emergency alert control part 227 records the state and display content of the emergency alert information received in the past as history information in the recording part 227A by cooperating with the emergency alert information output part 228 and the like.

The emergency alert information output part 228 processes the emergency alert information supplied from the emergency alert control part 227 and supplies the result to the presentation processing part 226.

The presentation processing part 226 performs presentation processing for presenting the emergency alert information supplied from the emergency alert information output part 228 on the output screen part 203, and outputs the resulting presentation data to the output screen part 203 via the video output terminal 212-1 or the subtitle output terminal 212-3.

The communication I/F 229 is an interface with a communication part (not shown) such as a network card or a wireless LAN adapter, and supplies a communication stream input via the input terminal 211-2 to the communication middleware 230.

The communication middleware 230 processes the communication stream supplied from the communication I/F 229 and supplies the resulting broadcast application to the broadcast application processing part 231. Here, the broadcast application is an application associated with content such as a broadcast program.

The broadcast application processing part 231 controls operations such as starting and ending of the broadcast application supplied from the communication middleware 230, and supplies data regarding the broadcast application to the presentation processing part 226.

The presentation processing part 226 performs presentation processing for presenting the broadcast application whose operation is controlled by the broadcast application processing part 231 on the output screen part 203, and outputs the resulting presentation data to the output screen part 203 via a broadcast application output terminal 212-5.

The remote controller I/F 232 is, for example, an interface with a light receiving part (not shown) such as an infrared light receiving part, and supplies an infrared signal, which is input via an input terminal 211-3 and supplied from the remote controller 21, to the receiver management part 233.

The receiver management part 233 manages the operation of each part performed by the receiving device 20 on the basis of information such as an infrared signal supplied from the remote controller I/F 232. For example, the receiver management part 233 manages the start mode of the receiving device 20 such as the normal start mode and the emergency alert priority mode. Furthermore, for example, the receiver management part 233 receives an input of the receiving setting of the emergency alert information according to the remote controller operation by the user, and notifies the emergency alert control part 227 of the input result.

Furthermore, in a case of determining to start the receiver application on the basis of the infrared signal, the receiver management part 233 notifies the receiver application processing part 234 of the determination. Here, the receiver application is an application installed in the receiving device 20 in advance.

The receiver application processing part 234 starts the receiver application on the basis of the notification supplied from the receiver management part 233, and supplies the data related to the receiver application to the presentation processing part 226.

The presentation processing part 226 performs presentation processing for presenting the receiver application started by the receiver application processing part 234 on the output screen part 203, and outputs the resulting presentation data to the output screen part 203 via a receiver application output terminal 212-4.

Note that, in FIG. 17, the broadcast application and the receiver application are distinguished from each other, but while the broadcast application is an application associated with content such as a broadcast program, the receiver application is, so to speak, a resident application, and includes, for example, an application (FIG. 25) for setting the receiving setting information and the likes. For example, the broadcast application is developed in a markup language such as HTML5 or a script language such as JavaScript (registered trademark) and can be displayed by a corresponding browser.

Furthermore, in the configuration shown in FIG. 17, the case where the broadcast application is acquired from the communication stream has been described, but the broadcast application may be acquired from the broadcast stream. Moreover, a part of components constituting a broadcast program or VOD content may be acquired and presented via communication. Furthermore, in the configuration shown in FIG. 17, the recording part 227A is included in the emergency alert control part 227, but information such as receiving setting information may be recorded in a non-volatile memory built in the system-on-chip (SoC) and commonly used by each part, or a non-volatile memory provided outside the system-on-chip (SoC). Moreover, in the configuration shown in FIG. 17, each block can exchange various types of data with other blocks as needed, as indicated by arrows between blocks.

Next, the details of the operation of the receiving device 20 at the time of receiving the emergency alert will be described with reference to FIGS. 18 to 23.

(Processing Flow of Broadcasting Tuner Part)

First, the processing flow performed by the broadcasting tuner part 201 will be described with reference to the flowchart in FIG. 18.

Figure 18:
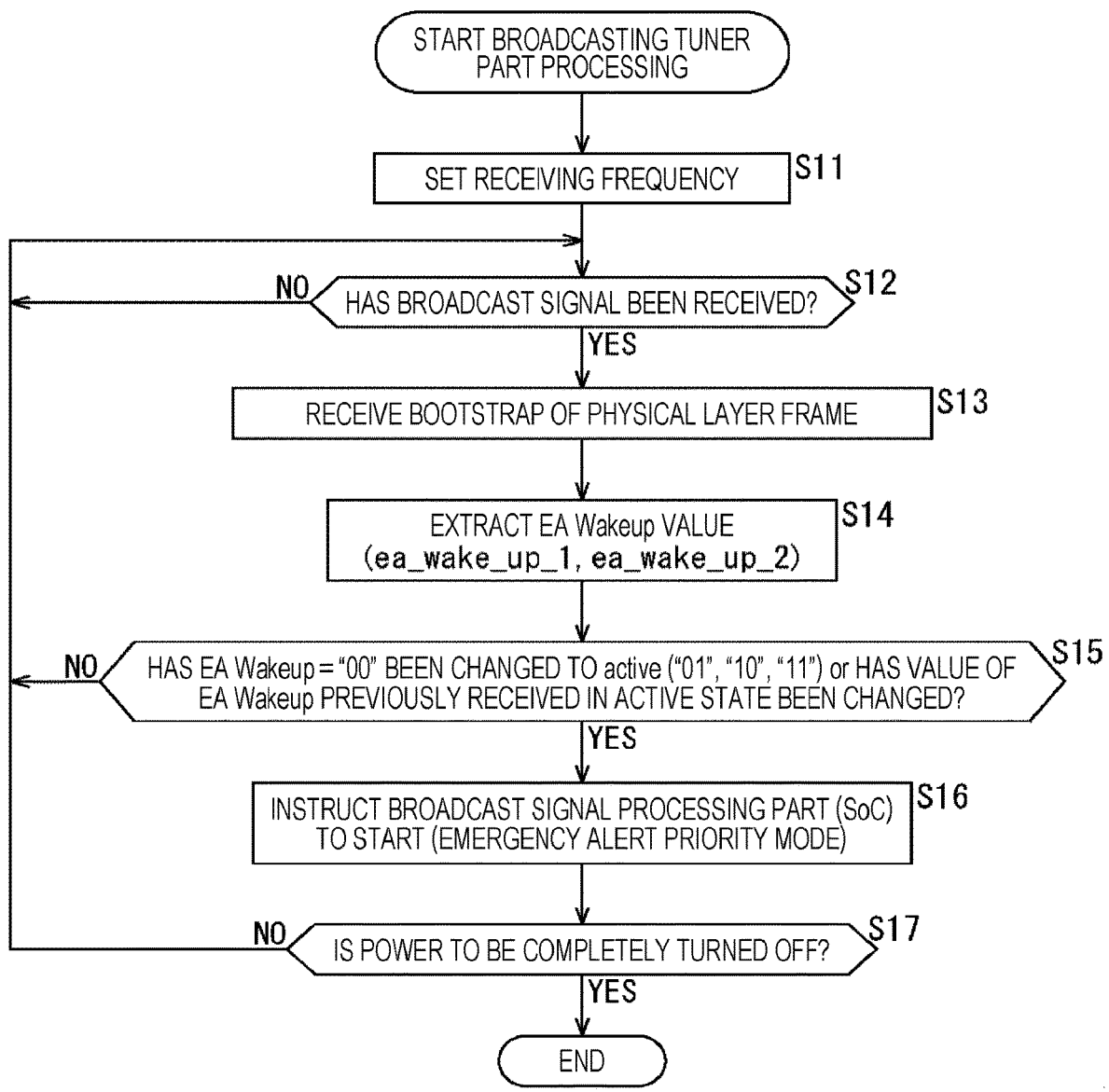
FIG. 18 is a flowchart for explaining a flow of processing of a broadcasting tuner part.

However, when the processing shown in FIG. 18 is performed, the receiving device 20 is operating in the standby mode, and the broadcasting tuner part 201 is started by being supplied with power from the power source, but power is not supplied to the broadcast signal processing part 202, the output screen part 203, the audio output part 204, and the like that are provided subsequently to the broadcasting tuner part 201, and they are in a stopped state.

In step S11, the broadcasting tuner part 201 sets the receiving frequency. For example, as this receiving frequency, the frequency band of the last channel, which is the last channel viewed at the time of previous start, is set.

In step S12, the broadcasting tuner part 201 determines whether a broadcast signal has been received via the receiving antenna. Note that, in performing this determination processing, it is sufficient that only the portion corresponding to the bootstrap in the physical layer frame is monitored.

In a case where it is determined in step S12 that the broadcast signal has not been received, the determination processing of step S12 is repeated. On the other hand, in a case where it is determined in step S12 that the broadcast signal has been received, the process proceeds to step S13.

In step S13, the broadcasting tuner part 201 processes the broadcast signal and receives the bootstrap of the physical layer frame.

In step S14, the broadcasting tuner part 201 processes the portion corresponding to the received bootstrap and extracts the value of the EA wakeup information (EA Wakeup). Here, 2 bits of ea_wake_up_1 and ea_wake_up_2 that compose the EA Wake up bit are extracted.

In step S15, the broadcasting tuner part 201 determines whether or not EA Wakeup="00" has been changed to active ("01", "10", "11") or the value of the EA Wakeup previously received in the active ("01", "10", "11") state has been changed, on the basis of the value of the extracted EA wakeup information (EA Wakeup).

In a case where it is determined in step S15 that neither of the two determination conditions is satisfied, the process returns to step S12, and the subsequent processes are performed. On the other hand, in a case where it is determined in step S15 that one of the two determination conditions is satisfied, the process proceeds to step S16.

In step S16, the broadcasting tuner part 201 instructs the broadcast signal processing part 202 to start. In other words, in the receiving device 20 that operates in the standby mode, the broadcast signal processing part 202 that is in a stopped state without being supplied with power is turned on and is started in the emergency alert priority mode.

In step S17, the broadcasting tuner part 201 determines whether or not the power is to be completely turned off. In a case where it is determined in step S17 that the power is not to be completely turned off, the process returns to step S12, and the subsequent processes are performed. In other words, in this case, the receiving device 20 continues to operate in the standby mode.

On the other hand, in a case where it is determined in step S17 that the power is to be completely turned off, the supply of power to the broadcasting tuner part 201 is stopped, and the processing shown in FIG. 18 ends. Note that "power is completely turned off" does not mean that the receiving device 20 operates in the standby mode, but means a state where the power is completely turned off by predetermined operation, and is a state where the broadcasting tuner part 201 is also not supplied with power and is not started.

The processing flow of the broadcasting tuner part 201 has been described above.

(Processing Flow of Broadcast Signal Processing Part (SoC))

Next, the processing flow performed by the broadcast signal processing part 202 will be described with reference to the flowcharts of FIGS. 19 and 20.

However, in performing the processing shown in FIGS. 19 and 20, power from the power source is not supplied to the broadcast signal processing part 202, the output screen part 203, the audio output part 204, and the like, that are provided subsequently to the broadcasting tuner part 201, and they are in a stopped state.

In other words, since the receiving device 20 is operating in the standby mode, the broadcast signal processing part 202 is in a command waiting state ("NO" in S31 and S32). Then, in a case where the broadcast signal processing part 202 determines that the start instruction has been received ("YES" in S32), the process proceeds to step S33.

In step S33, the broadcast signal processing part 202 determines whether or not the received start instruction is a start instruction in the emergency alert priority mode.

In a case where it is determined in step S33 that the instruction is not the start instruction in the emergency alert priority mode, the process proceeds to step S34.

In step S34, the broadcast signal processing part 202 performs processing for starting the receiving system in the normal start mode and displaying the broadcasting service.

In other words, here, since power-on of the receiving device 20 that operates in the standby mode is instructed by the remote controller operation by the user and a timer setting for viewing reservation or the like so that start of the broadcast signal processing part 202 has been instructed, the receiving device 20 operates in the normal start mode to display the broadcasting service. Note that, here, the respective parts (functions) of the receiving device 20 are collectively referred to as a receiving system.

The processing of step S34 is continued until the power-off of the receiving device 20 is instructed ("NO" in S34 and S35). Then, in a case where the power-off of the receiving device 20 is instructed ("YES" in S35), the process proceeds to step S36, and the receiving device 20 makes a transition from the normal start mode to the standby mode (S36). Note that when the processing of step S36 ends, the processing shown in FIGS. 19 and 20 ends.

On the other hand, in a case where it is determined in step S33 that the instruction is the start instruction in the emergency alert priority mode, the process proceeds to step S37. Note that the start instruction in the emergency alert priority mode corresponds to the start instruction issued by the broadcasting tuner part 201 to the broadcast signal processing part 202 in the processing of step S16 of FIG. 18 described above.

In step S37, the emergency alert control part 227 performs start determination processing of the receiving system. In the start determination processing of the receiving system, it is determined whether to start the receiving system in the emergency alert priority mode on the basis of the AEAT metadata including the emergency alert information, the receiving setting information, and the history information. Note that the details of the start determination processing of the receiving system will be described later with reference to the flowchart in FIG. 21.

In step S38, the emergency alert control part 227 determines whether to start the receiving system in the emergency alert priority mode on the basis of the determination result of the start determination processing of the receiving system.

In a case where it is determined in step S38 that the receiving system is not started in the emergency alert priority mode, the process proceeds to step S36. In this case, the receiving device 20 will continue to operate in the standby mode (S36).

On the other hand, in a case where it is determined in step S38 that the receiving system is started in the emergency alert priority mode, the process proceeds to step S39, and the receiving system is started in the emergency alert priority mode (S39).

In step S40, the emergency alert control part 227 acquires the AEAT metadata extracted from the broadcast stream by the broadcast middleware 223.

In step S41, the emergency alert control part 227 determines whether or not the emergency alert service is designated on the basis of the acquired AEAT metadata (for example, the information of the LiveMedia element in FIG. 15).

In a case where it is determined in step S41 that the emergency alert service is designated, the process proceeds to step S42. In step S42, the started receiving system selects the emergency alert service and displays the emergency alert program (for example, screen D42 of FIG. 7 and the like).

Furthermore, in a case where it is determined in step S41 that the emergency alert service is not designated, the process proceeds to step S43. In step S43, the broadcasting service of the channel being selected (last channel) is selected by the started receiving system, and a normal program (for example, screen D43 of FIG. 7 and the like) is displayed.

When the processing of step S42 or S43 ends, the process proceeds to step S44. In step S44, the presentation processing part 226 displays the emergency alert information included in the acquired AEAT metadata (for example, the text information of the AEA message of the AEAText element of FIG. 15) on the output screen part 203 (for example, screen D42, screen D43, or the like of FIG. 7).

In step S45, the emergency alert control part 227 determines whether or not the emergency alert service has been updated on the basis of the AEAT metadata.

In a case where it is determined in step S45 that the emergency alert service has been updated, the process proceeds to step S46. In step S46, the emergency alert control part 227 performs update processing of the emergency alert information.

Furthermore, in a case where it is determined in step S45 that the emergency alert service has not been updated, the process of step S46 is skipped and the process proceeds to step S47. In step S47, it is determined whether or not the power-off of the receiving device 20 has been instructed by the remote controller operation by the user or the like.

In a case where it is determined in step S47 that the power-off of the receiving device 20 has not been instructed, the process returns to step S45, and the subsequent processes are repeated. In other words, in the receiving device 20, for example, when the emergency alert information A1 is being displayed and the emergency alert service is updated before the power-off is instructed, update processing from the emergency alert information A1 to the emergency alert information A2 is performed. On the other hand, in a case where it is determined in step S47 that power-off of the receiving device 20 has been instructed, the process proceeds to step S48.

In step S48, the emergency alert control part 227 records the state and display content of the emergency alert information in the recording part 227A as history information related to the emergency alert information received last time (past). By recording such history information, the past history can be reflected in the start determination processing of the receiving system from the next time onward.

Then, when the processing of step S48 ends, the process proceeds to step S49, and the receiving device 20 makes transition from the emergency alert mode to the operation in the standby mode (S49). Note that when the processing of step S49 ends, the processing shown in FIGS. 19 and 20 ends.

The processing flow of the broadcast signal processing part 202 has been described above.

(Flow of Start Determination Processing of Receiving System)

Figure 21:
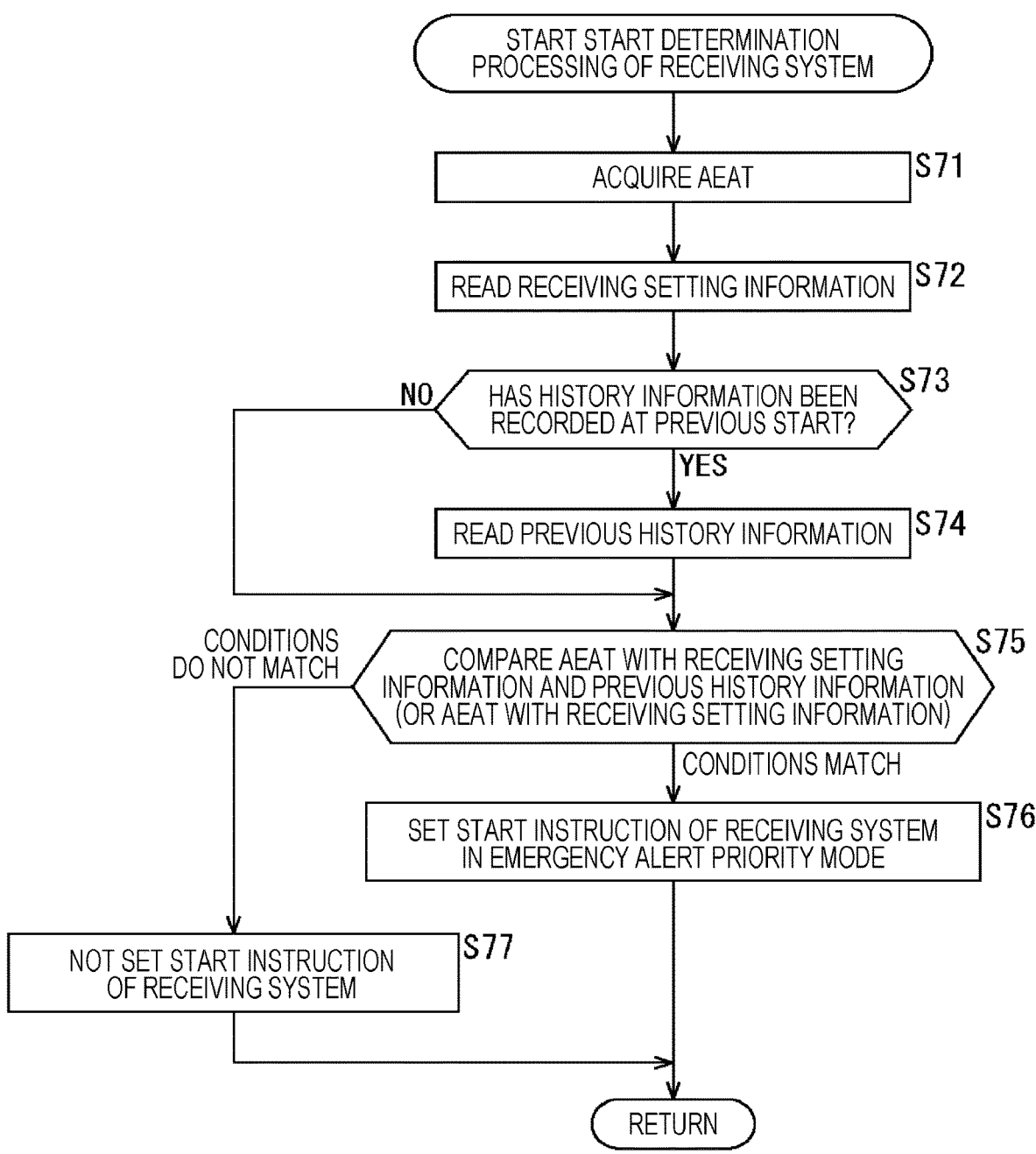
FIG. 21 is a flowchart for explaining a detailed flow of start determination processing of a receiving system.

Next, with reference to the flowchart of FIG. 21, the details of the start determination process of the receiving system corresponding to the processing of step S37 of FIG. 19 will be described.

In step S71, the emergency alert control part 227 acquires the AEAT metadata extracted from the broadcast stream. Furthermore, in step S72, the emergency alert control part 227 reads and acquires the receiving setting information recorded in the recording part 227A.

In step S73, the emergency alert control part 227 determines whether or not history information has been recorded at the previous (or past) start.

In a case where it is determined in step S73 that the history information has been recorded at the previous (or past) start, the process proceeds to step S74. In step S74, the emergency alert control part 227 reads and acquires the previous (or past) history information (the state or display content of the previous (or past) emergency alert information) recorded in the recording part 227A. This history information includes, for example, information such as display contents of past emergency alert information and information (so to say, version) that has been displayed most recently. By using these pieces of information, control such as not presenting the emergency alert information having the same content again becomes possible.

When the processing of step S74 ends, the process proceeds to step S75. Furthermore, in a case where it is determined in step S73 that the previous (or past) state or display content of the emergency alert information has not been recorded, the process of step S74 is skipped and the process proceeds to step S75.

In step S75, the emergency alert control part 227 compares AEAT metadata (information associated with emergency alert information included therein) acquired in the processing of step S71, with the receiving setting information acquired in the processing of step S72 and the previous (or past) history information (the state or display contents of the previous (or past) emergency alert information) acquired in the processing of step S74 to determine whether or not the conditions for start of the receiving system in the emergency alert priority mode are satisfied.

However, in a case where it is determined that the previous history information has not been recorded in the determination processing in step S73 described above ("NO" in S73), in the determination processing in step S75, the AEAT metadata is compared with the receiving setting information to determine whether or not the conditions for starting the receiving system in the emergency alert priority mode are satisfied.

In a case where it is determined in step S75 that the conditions for starting the receiving system in the emergency alert priority mode match, the process proceeds to step S76. In step S76, the emergency alert control part 227 sets an instruction to start the receiving system in the emergency alert priority mode to the emergency alert information output part 228 and the like. In the setting of the start instruction, start of the broadcast signal processing part 202, the output screen part 203, the audio output part 204, or the like is instructed.

On the other hand, in a case where it is determined in step S75 that the conditions for starting the receiving system in the emergency alert priority mode do not match, the process proceeds to step S77. In step S77, the emergency alert control part 227 does not set an instruction to start the receiving system in the emergency alert priority mode.

Figure 19:
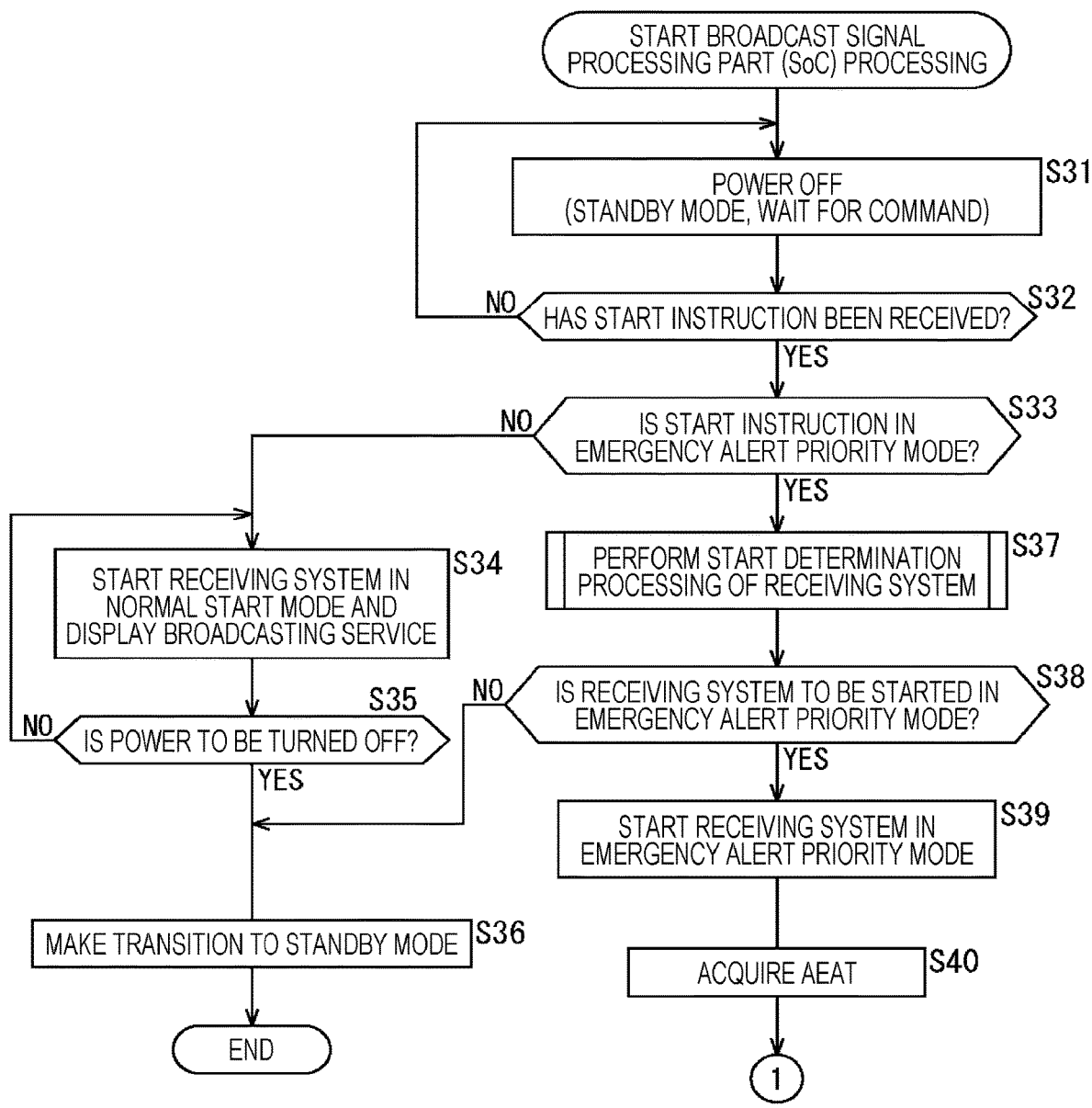
FIG. 19 is a flowchart for explaining a flow of processing of the broadcast signal processing part (SoC).
Figure 20:
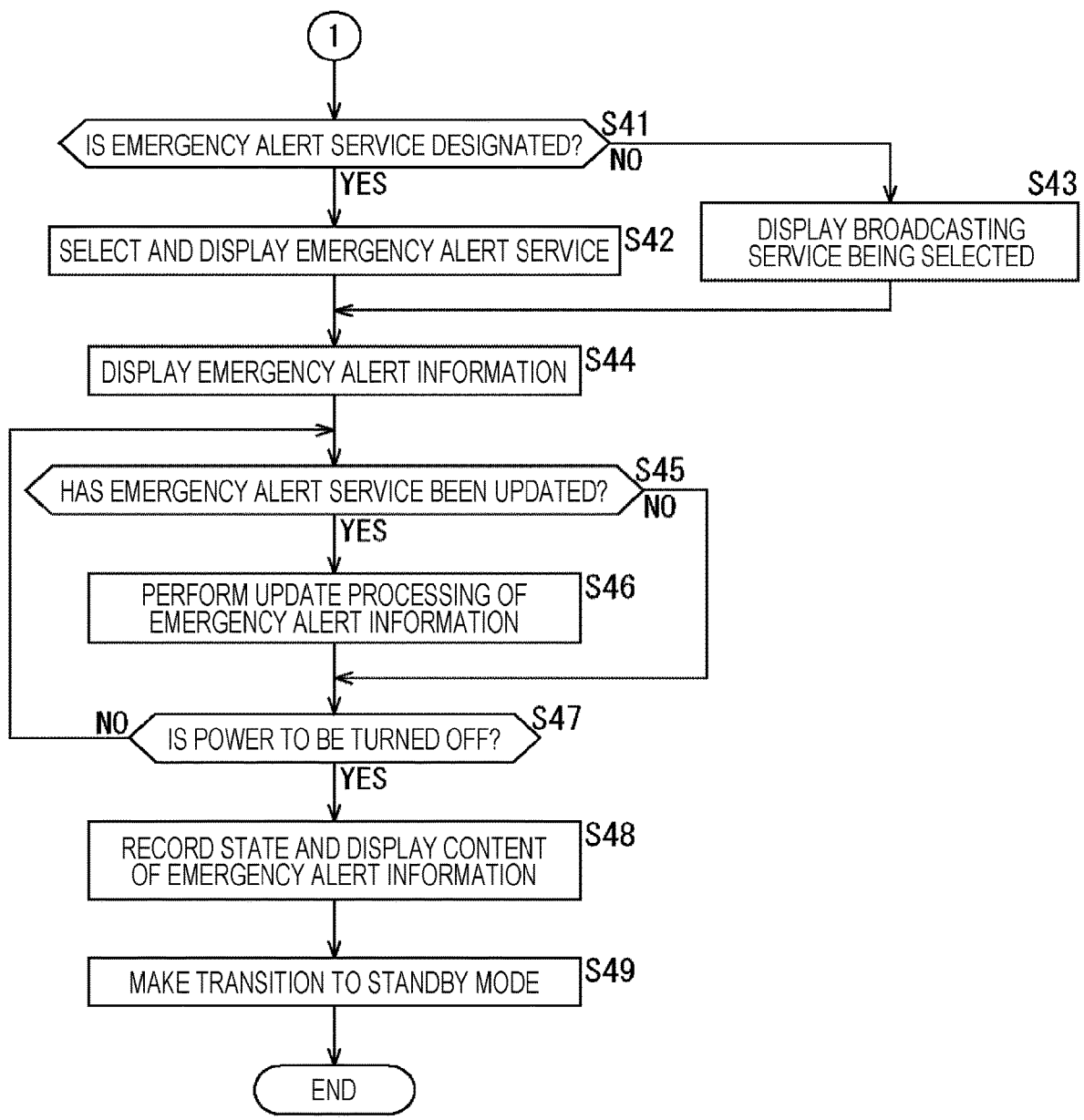
FIG. 20 is a flowchart for explaining a flow of processing of the broadcast signal processing part (SoC).

When the processing of step S76 or S77 ends, the process returns to step S37 of FIG. 19 and the subsequent processes are performed.

In other words, in the determination processing of step S75, in a case where it is determined that the conditions of start match, the processing of step S76 is performed, so that, in the determination processing of step S38 of FIG. 19, it is determined to start the receiving system in the emergency alert priority mode. On the other hand, in the determination processing of step S75, in a case where it is determined that the conditions of start do not match, the processing of step S77 is performed, so that, in the determination processing of step S38 of FIG. 19, it is determined not to start the receiving system in the emergency alert priority mode.

The flow of the start determination processing of the receiving system has been described above.

Here, a specific example of the start determination processing of the receiving system (processing of step S37 of FIG. 19) will be described. FIG. 22 shows items compared in step S75 of FIG. 21 in performing the determination processing as to whether or not the conditions for starting the receiving system in the emergency alert priority mode are satisfied.

These comparison items can include the item corresponding to the AEAT metadata in FIGS. 14 and 15 described above. For example, as shown in FIG. 22, combination of the audience element, the aeaType attribute, the priority attribute, the EventCode element of the Header element, the Location element of the Header element, and the combination of the aeaId attribute and the refAEAId attribute, which are child elements of the AEA element of the AEAT element, can be used.

The audience attribute can specify "public", "restricted", or "private" as the receiver of the emergency alert information. The "public" indicates emergency alert information for general receivers. The "restricted" indicates emergency alert information for restricted receivers. The "private" indicates emergency alert information for designated receivers.

The aeaType attribute can specify "alert", "update", or "cancel" as the type of emergency alert information. The "alert" indicates new emergency alert information. The "update" indicates that it is update information of the already distributed emergency alert information. The "cancel" indicates that the already distributed emergency alert information has been canceled.

The priority attribute can specify a value of 0 to 4 as the priority of the emergency alert information. 4 indicates the highest priority, the smaller the number, the lower the priority, and 0 indicates the lowest priority.

The EventCode element of the Header element indicates the event type of emergency alert information. For example, in a case where "EVI" is specified as the event type, it indicates evacuation warning.

The Location element of the Header element indicates the relevant area of the emergency alert information. For example, in the case of the United States, a seven-digit code called a Federal Information Processing Standard (FIPS) and the like can be used as the relevant area.

The ID that identifies the emergency alert information is indicated by the combination of the aeaId attribute and the refAEAId attribute.

Here, the aeaId attribute is set for the AEAT metadata with the aeaType attribute="alert". Furthermore, for AEAT metadata with aeaType attribute="update", "cancel", the value of the aeaId attribute of the target AEAT metadata is described as the value of the refAEAId attribute.

Figure 23:
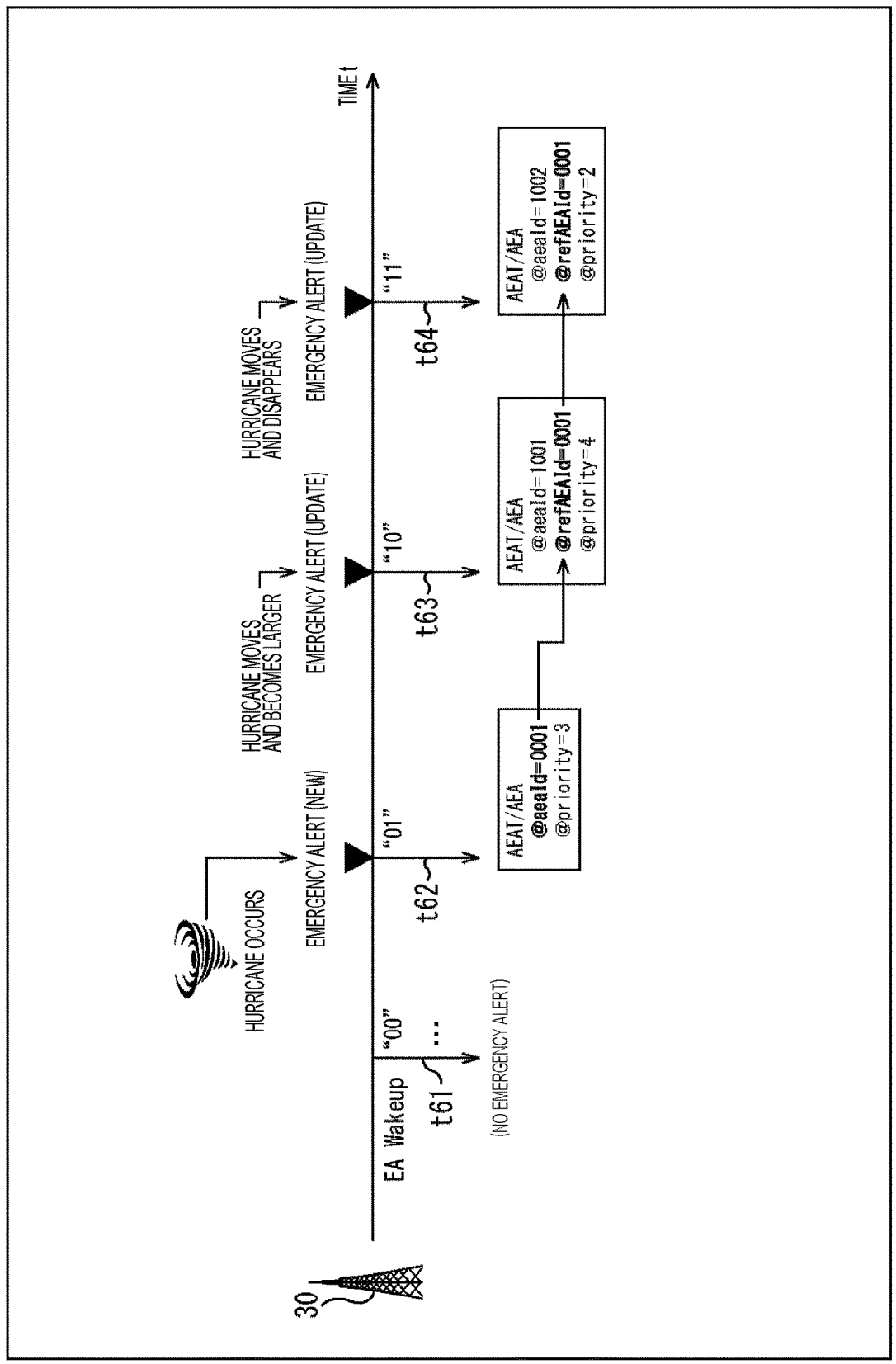
FIG. 23 is a diagram showing an example of a method of identifying emergency alert information.

For example, as shown in FIG. 23, at time t62 when a hurricane occurs, when the value of bootstrap EA Wakeup changes from "00" to "01" and a new emergency alert is distributed, aeaId attribute=0001, and priority attribute=3 are described in the respective AEAT metadata.

Thereafter, as the hurricane moves and becomes larger, the emergency alert is updated at time t63, and the value of EA Wakeup changes from "01" to "10". aeaId attribute=1001, refAEAId attribute=0001, and priority attribute=4 are described in the respective AEAT metadata distributed at this time.

Thereafter, as the hurricane moves and disappears, the emergency alert is further updated at time t64, and the value of EA Wakeup changes from "10" to "11". aeaId attribute=1002, refAEAId attribute=0001, and priority attribute=2 are described in the respective AEAT metadata distributed at this time.

As described above, each time the emergency alert is updated, the value of the refAEAId attribute is made the same as the value of the aeaId attribute of the new (before update) AEAT metadata, and the value of the aeaId attribute is incremented by one, so that the receiving device 20 can uniquely identify the series of emergency alert information by the combination of the aeaId attribute and the refAEAId attribute. Therefore, for example, as shown in FIG. 8 described above, it is possible to identify the series of the emergency alert information on the basis of the identification information (IDs indicated by aeaId attribute and refAEAId attribute) included in the AEAT metadata to perform processing for each emergency alert information of the same series.

Furthermore, since such start determination processing of the receiving system is performed, by setting receiving setting information (filter setting), for example, the user can acquire only the information that the user wants to receive (desired emergency alert information), such as receiving only emergency alert information with a high priority (emergency alert information with a priority of "2" or higher) around the area where the user lives.

(Flow of Receiving Setting Processing of Emergency Alert Information)

Furthermore, the receiving setting information of the emergency alert information used in the start determination processing of the receiving system (the processing of step S37 of FIG. 19, that is, the processing of step S75 of FIG. 21) is set in advance by the receiving device 20. Therefore, next, the flow of the receiving setting processing of the emergency alert information will be described with reference to the flowchart of FIG. 24.

The receiving device 20 waits for an instruction for receiving setting of emergency alert information from the user ("NO" in S91 and S92). Then, for example, in a case where the user operates the remote controller 21 to issue an instruction for screen display of the receiving setting of the emergency alert information ("YES" in S92), the process proceeds to step S93.

In step S93, the presentation processing part 226 displays the receiving setting screen of the emergency alert information on the output screen part 203.

In step S94, the receiver management part 233 receives the input of the receiving setting of the emergency alert information on the basis of, for example, the infrared signal from the remote controller 21 according to the operation of the user.

In step S95, the emergency alert control part 227 records the receiving setting information of the emergency alert information in the recording part 227A on the basis of the received input of the receiving setting of the emergency alert information.

When the processing of step S95 ends, the process proceeds to step S96. In step S96, it is determined whether or not the input of the receiving setting of the emergency alert information has been completed.

In a case where it is determined in step S96 that the input of the receiving setting of the emergency alert information is continued, the processing returns to step S94 and the processing of steps S94 to S95 are repeated. Therefore, various types of receiving setting information are sequentially input and recorded in the recording part 227A.

Figure 24:
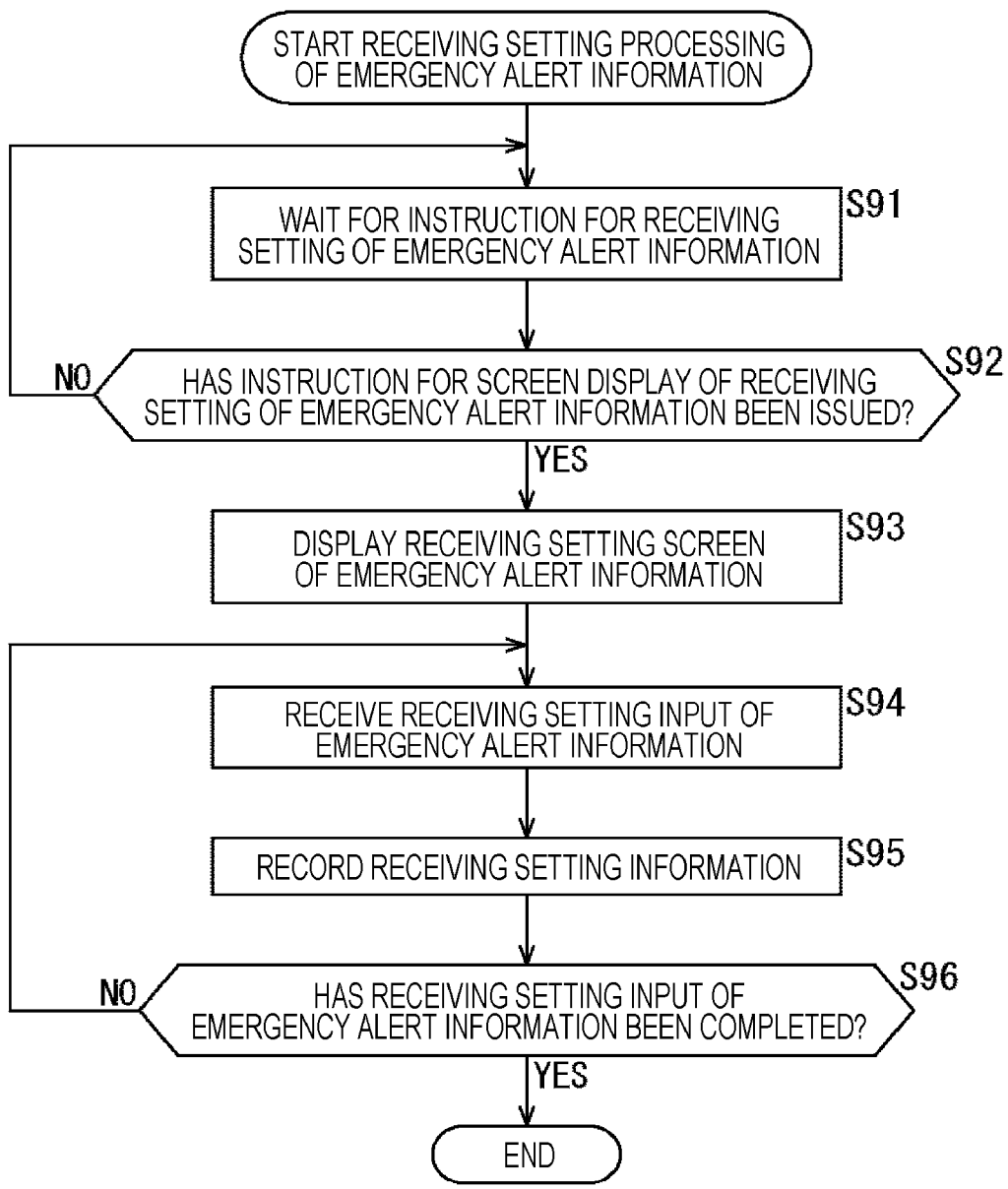
FIG. 24 is a flowchart for explaining a flow of receiving setting processing of emergency alert information.

Furthermore, in a case where it is determined in step S96 that the input of the receiving setting of the emergency alert information has been completed, the processing shown in FIG. 24 is completed.

The flow of the receiving setting processing of the emergency alert information has been described above.

Figure 25:
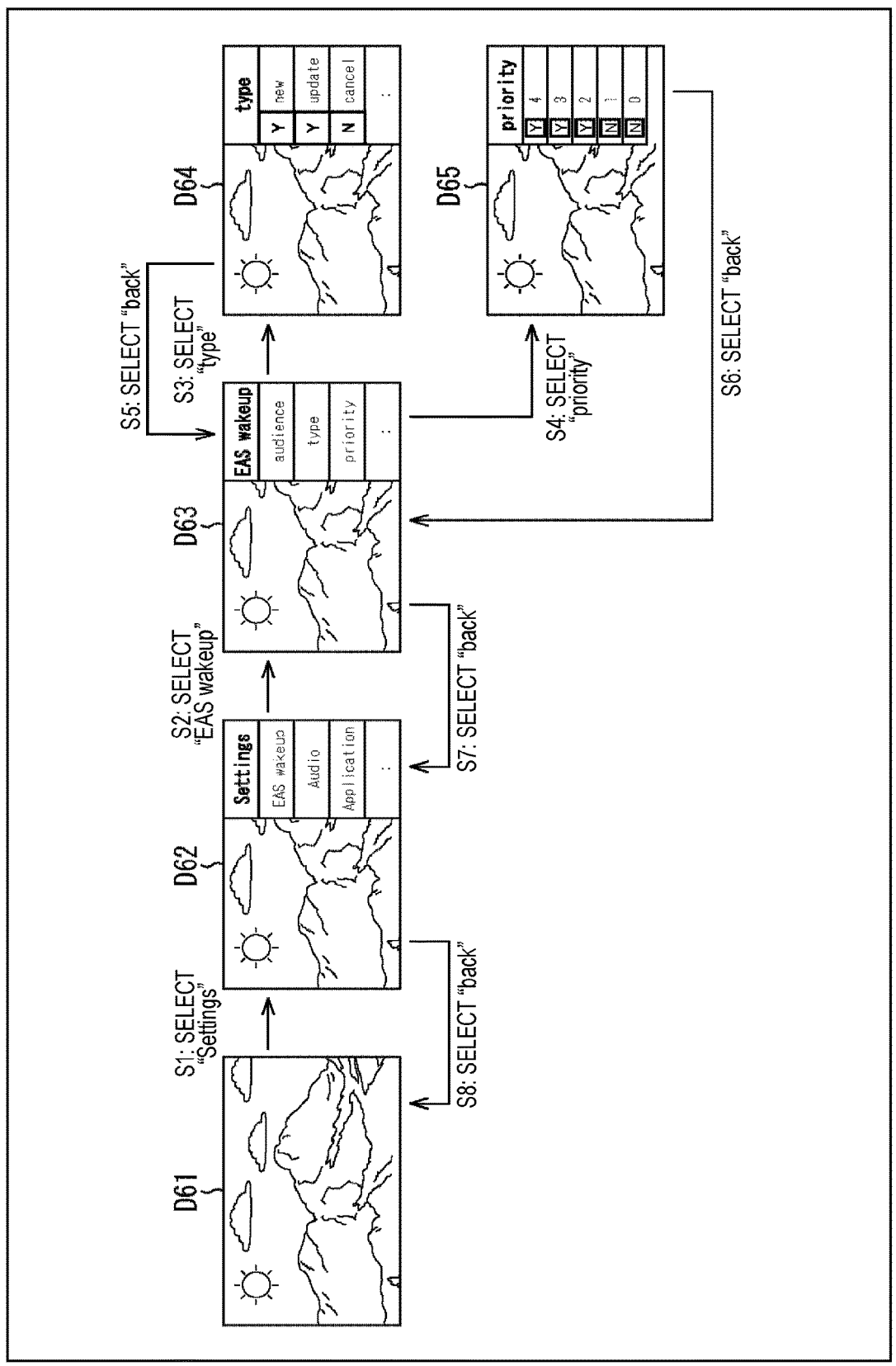
FIG. 25 is a diagram showing an example of a receiving setting screen for emergency alert information.

Here, FIG. 25 shows an example of the receiving setting screen for emergency alert information displayed on the output screen part 203. The transition of the receiving setting screen shown in FIG. 25 shows an example of setting of conditions for starting the receiving system in the emergency alert priority mode in receiving emergency alert information.

In a case where the user has not instructed the screen display of the receiving setting of the emergency alert information, a normal broadcast program is displayed on the output screen part 203 (screen D61). Thereafter, in a case where the user operates the remote controller 21 and selects "Settings" (S1 in the drawing), the setting screen is displayed in a part of the display area (display area on the right side) (screen D62).

In this setting screen (screen D62), in addition to the receiving setting of the emergency alert information ("EAS wakeup"), for example, audio ("Audio"), application ("Application") settings, or the like can be selected. Here, in a case where the receiving setting of the emergency alert information ("EAS wakeup") is selected from the items on this setting screen (screen D62) (S2 in the drawing), the setting screen displayed in the display area on the right side is switched to the receiving setting screen of the emergency alert information (screen D63).

On this receiving setting screen (screen D63), items such as "audience" that sets the target of emergency alert information, "type" that sets the type of emergency alert information, and "priority" that sets the priority of emergency alert information can be selected.

Here, in a case where the "type" is selected from the items on this receiving setting screen (screen D63) (S3 in the drawing), the receiving setting screen displayed in the display area on the right side is switched to the type setting screen (screen D64). In this type setting screen (screen D64), it is possible to set enable or disable receiving for each setting item of "new" (corresponding to "alert" of the above-described aeaType attribute) indicating new emergency alert information, "update" indicating update information of already distributed emergency alert information, and "cancel" indicating that the already distributed emergency alert information has been canceled.

In the example of this type setting screen (screen D64), "Y" is set to enable receiving for the setting item that is "new", "Y" is set to enable receiving for the setting item that is "update", and "N" is set to disable receiving for the setting item of "cancel", so that only new emergency alert information and updated emergency alert information are presented. In other words, in a case of this setting, the cancellation emergency alert information is not presented.

Furthermore, in a case where the "priority" is selected from the items on this receiving setting screen (screen D63) (S4 in the drawing), the receiving setting screen displayed in the display area on the right side is switched to the priority setting screen (screen D65). On this priority setting screen (screen D65), whether or not to receive can be set for each setting item of "0", "1", "2", "3", and "4" corresponding to the priority of 0 to 4.

In this example of the priority setting screen (screen D65), "N" is set to disable receiving for the setting items that are "0" and "1", and "Y" is set to enable receiving for the setting items that are "2" to "4", so that only the emergency alert information of the priority levels of 2 to 4, that is, higher priority level is presented. In other words, in a case of this setting, the priority of 0 to 1, that is, the emergency alert information having a lower priority is not presented.

Note that, although the type setting screen and the priority setting screen have been described as an example here, the audience setting screen and the like also can be presented by a similar user interface, and desired receiving setting information can be registered by the remote controller operation by the user, or the like.

Furthermore, in a case where the user operates the remote controller 21 and selects "back", the screen displayed immediately before is displayed again. For example, in a case where "back" is selected while the type setting screen (screen D64) or the priority setting screen (screen D65) is displayed (S5 and S6 in the drawing), the receiving setting screen (screen D63) is displayed.

Moreover, for example, in a case where "back" is selected while the receiving setting screen (screen D63) is displayed (S7 in the drawing), the setting screen (screen D62) is displayed, and in a case where "back" is selected while the setting screen (screen D62) is displayed (S8 in the drawing), a normal broadcast program (screen D61) is displayed.

2. Modification

In the above description, ATSC (particularly, ATSC3.0), which is a system adopted in the United States and the like as a standard for digital broadcasting, has been described, but the present technology may be applied to, for example, the Integrated Services Digital Broadcasting (ISDB) which is a method adopted by Japan and the like, or Digital Video Broadcasting (DVB) which is a method adopted by European countries and the like.

Furthermore, in the transmission system 1, the transmission path 80 is not limited to terrestrial broadcasting, and may be, for example, satellite broadcasting using a broadcasting satellite (BS) or a communication satellite (CS), or cable broadcasting (CATV) using a cable. Moreover, in the above description, the system for emergency notification (EAS) in the United States has been described as an example, but the present technology may be applied to a similar system constructed in each country.

Furthermore, in the above description, the case where the emergency alert information is text information has been described, but the present technology can be similarly applied to not only text information but also information other than text information such as images and videos, for example. Furthermore, the present technology can be similarly applied to the case where the text information of the emergency alert information is embedded in the video (uncompressed video data) of the content such as a broadcast program (so-called burned text), or the voice corresponding to the emergency alert information is embedded in the audio data.

Note that the names of signaling such as LLS and SLS described above are examples, and other names may be used, but the difference in these names is a difference in form and the substantial contents of each signaling are not different. Moreover, in a case where signaling is described in a markup language such as XML, the names of those elements and attributes are examples, and other names may be adopted.

Furthermore, the broadcast application is not limited to an application performed by a browser, but may be performed in an operating system (OS) environment or the like as a so-called native application. Moreover, as the above-described content, in addition to broadcast programs and commercial, all kinds of content such as moving images, music, electronic books, games, and advertisements, for example, can be included.

Note that, in the above description, the operation mode of the receiving device 20 is described, but in the standby mode (standby state), the broadcasting tuner part 201 is started, while the receiving system such as the broadcast signal processing part 202, the output screen part 203, and the audio output part 204 are not started. Furthermore, in the above description, "turning on the power" means turning on the power of the receiving device 20 that operates in the standby mode (in other words, it also can be said that the broadcast signal processing part 202 and the like that are not supplied with power and in the stopped state are started), and "turning off the power" means causing the receiving device 20 that is powered on and operating, to operate in the standby mode. Note that, in the above description, in the receiving device 20, the state where the broadcasting tuner part 201 is not started is expressed as "power is completely turned off" and is distinguished from the above "turning off the power".

3. Computer Configuration

Figure 26:
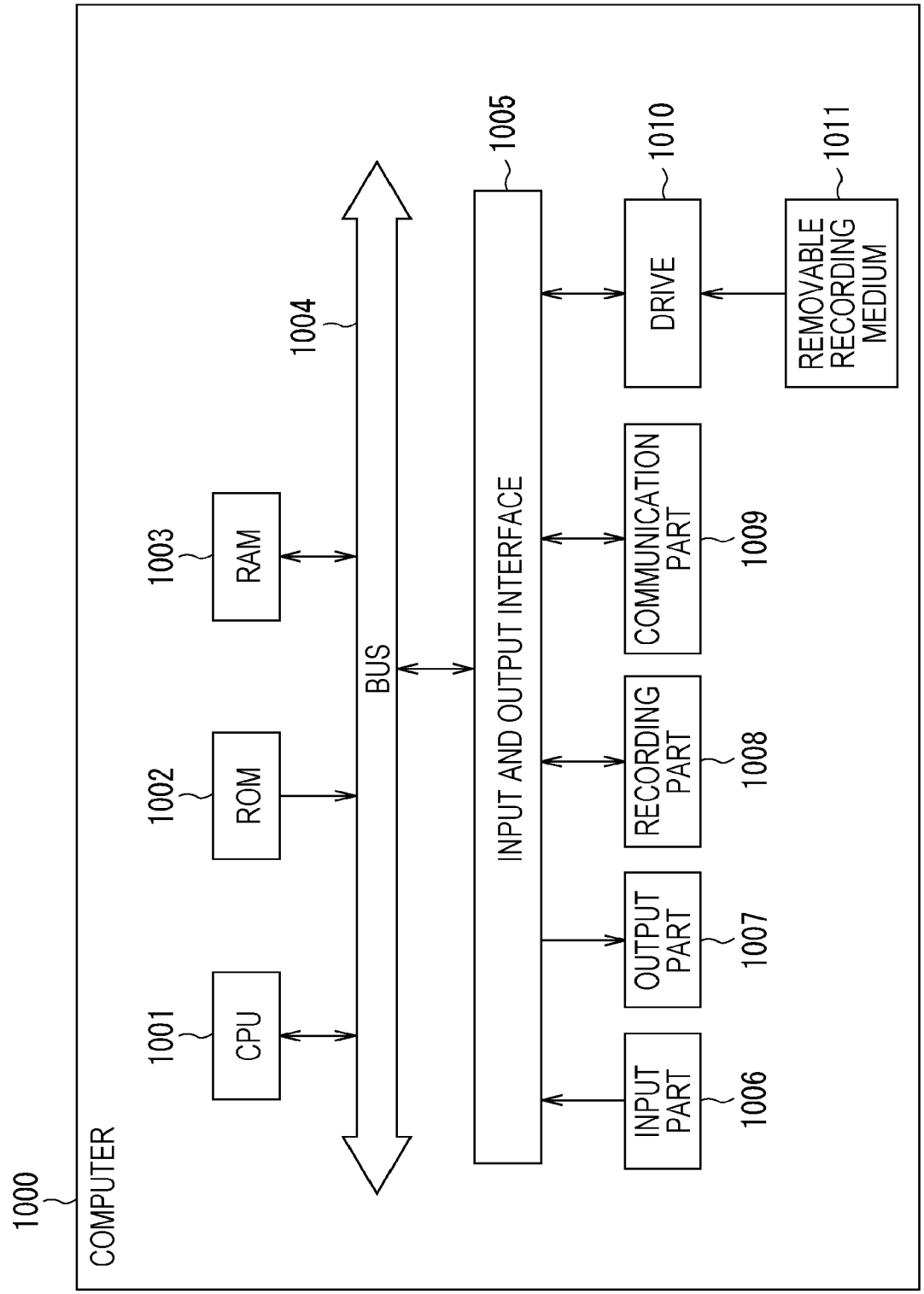
FIG. 26 is a diagram showing a configuration example of a computer.

The series of processing described above can be also performed by hardware or can be performed by software. In a case where a series of processing is performed by software, a program constituting the software is installed in a computer. FIG. 26 is a diagram showing an example of a hardware configuration of a computer that executes the above-described series of processing by a program.

In a computer 1000, a central processing part (CPU) 1001, a read only memory (ROM) 1002, and a random access memory (RAM) 1003 are mutually connected by a bus 1004. An input and output interface 1005 is further connected to the bus 1004. An input part 1006, an output part 1007, a recording part 1008, a communication part 1009, and a drive 1010 are connected to the input and output interface 1005.

The input part 1006 includes a keyboard, a mouse, a microphone, and the like. The output part 1007 includes a display, a speaker, and the like. The recording part 1008 includes a hard disk, a nonvolatile memory, and the like. The communication part 1009 includes a network interface and the like. The drive 1010 drives a removable recording medium 1011 such as a magnetic disk, an optical disk, a magneto-optical disk, or a semiconductor memory.

In the computer 1000 configured as described above, the CPU 1001 loads the program recorded in the ROM 1002 or the recording part 1008 into the RAM 1003 via the input and output interface 1005 and the bus 1004, and executes the program, so that the above-described series of processing is performed.

The program executed by the computer 1000 (CPU 1001) can be provided by being recorded on the recording medium 1011 as a package medium or the like, for example. Furthermore, the program can be provided via a wired or wireless transmission medium such as a local area network, the Internet, or digital satellite broadcasting.

In the computer 1000, a program can be installed in the recording part 1008 via the input and output interface 1005 by mounting the recording medium 1011 to the drive 1010. Furthermore, the program can be received by the communication part 1009 via a wired or wireless transmission medium and installed in the recording part 1008. In addition, the program can be installed in the ROM 1002 or the recording part 1008 in advance.

Here, in the present specification, processing performed by a computer according to a program does not necessarily need to be performed in a time series in the order described in the flowchart. That is, the processing performed by the computer according to the program also includes processing executed in parallel or individually (for example, parallel processing or processing by an object). Furthermore, the program may be processed by one computer (processor) or processed by a plurality of computers in a distributed manner.

Note that the embodiments of the present technology are not limited to the above-described embodiments, and various modifications are possible without departing from the gist of the present technology.

Furthermore, the present technology can also adopt the following configuration.

(1)

A receiving device including:
a receiving part that receives a broadcast signal; and
a processing part that processes the broadcast signal that has been received,
in which the receiving part instructs the processing part in a standby state to start on the basis of emergency alert start information included in the broadcast signal that has been received, and
in a case of being instructed by the receiving part to start, the processing part controls presentation of emergency alert information on the basis of signaling including the emergency alert information acquired from the broadcast signal that has been received, and receiving setting information related to a receiving setting of the emergency alert information set by a user.

(2)

The receiving device according to (1) above,
in which the processing part
acquires history information associated with the emergency alert information received in the past, and
controls presentation of the emergency alert information on the basis of the signaling, the receiving setting information, and the history information.

(3)

The receiving device according to (2) above,
in which the receiving device has
a first mode corresponding to operation at normal start, and
a second mode corresponding to operation at emergency alert, and in a case of being instructed to start in the second mode, the processing part controls the presentation of the emergency alert information on the basis of the signaling, the receiving setting information, and the history information.

(4)
The receiving device according to (2) or (3) above,
in which the processing part
identifies a series of the emergency alert information on the basis of identification information included in the signaling, and
controls the presentation of the emergency alert information for each series that has been identified.

(5)
The receiving device according to any one of (1) to (4) above,
in which the receiving setting information includes at least receiving setting related to a receiver of a target of the emergency alert information, a type of the emergency alert information, a priority of the emergency alert information, an event type of the emergency alert information, and a relevant area of the emergency alert information.

(6)
The receiving device according to (2) above,
in which the history information includes at least a state and a display content of the emergency alert information received in the past.

(7)
The receiving device according to any one of (1) to (6) above,
in which the emergency alert start information is included in a frame of a physical layer, and
the emergency alert information is included in signaling in an upper layer.

(8)
The receiving device according to any one of (2) to (4) above, further including
a recording part that records the receiving setting information and the history information,
in which the processing part compares information associated with the emergency alert information included in the received signaling with the receiving setting information and the history information that have been recorded, and only in a case where a comparison result matches presentation conditions, the processing part presents the emergency alert information.

(9)
The receiving device according to any one of (1) to (8) above
configured as a television receiver including the receiving part as a tuner part and the processing part as a system-on-chip.

(10)
A receiving method of a receiving device including
a receiving part that receives a broadcast signal, and
a processing part that processes the broadcast signal that has been received, the method including:
instructing, by the receiving part, the processing part in a standby state to start on the basis of emergency alert start information included in the broadcast signal that has been received; and
in a case of being instructed by the receiving part to start, controlling, by the processing part, presentation of emergency alert information on the basis of signaling including the emergency alert information acquired from the broadcast signal that has been received, and receiving setting information related to a receiving setting of the emergency alert information set by a user.

(11)
A signal processing device including
a control part that, in a case of being instructed by a receiving part that receives a broadcast signal during standby to start, controls presentation of emergency alert information on the basis of signaling including the emergency alert information acquired from the broadcast signal that has been received, and receiving setting information related to a receiving setting of the emergency alert information set by a user.

(12)
The signal processing device according to (11) above,
in which the control part
acquires history information associated with the emergency alert information received in the past, and
controls the presentation of the emergency alert information on the basis of the signaling, the receiving setting information, and the history information.

(13)
The signal processing device according to (12) above,
in which the signal processing device has
a first mode corresponding to operation at normal start, and
a second mode corresponding to operation at emergency alert, and
in a case of being instructed to start in the second mode, the control part controls the presentation of the emergency alert information on the basis of the signaling, the receiving setting information, and the history information.

(14)
The signal processing device according to (12) or (13) above,
in which the control part
identifies a series of the emergency alert information on the basis of identification information included in the signaling, and
controls presentation of the emergency alert information for each series that has been identified.

(15)
The signal processing device according to any one of (11) to (14) above,
in which the receiving setting information includes at least a receiving setting related to a receiver of a target of the emergency alert information, a type of the emergency alert information, a priority of the emergency alert information, an event type of the emergency alert information, and a relevant area of the emergency alert information.

(16)
The signal processing device according to (12) above,
in which the history information includes at least a state and a display content of the emergency alert information received in the past.

(17)
The signal processing device according to any one of (11) to (16) above,
in which the emergency alert information is included in signaling in an upper layer.

(18)
The signal processing device according to any one of (12) to (14) above, further including
a recording part that records the receiving setting information and the history information, in which the control part compares information associated with the emergency alert information included in the signaling that has been received with the receiving setting information and the history information that have been recorded, and only in a case where a comparison result matches presentation conditions, the control part presents the emergency alert information.

(19)
The signal processing device according to any one of (11) to (18)
configured as a system-on-chip.

(20)
A signal processing method of a signal processing device, in which, in a case of being instructed by a receiving part that receives a broadcast signal during standby to start, the signal processing device controls presentation of emergency alert information on the basis of signaling including the emergency alert information acquired from the broadcast signal that has been received, and receiving setting information related to a receiving setting of the emergency alert information set by a user.

REFERENCE SIGNS LIST

1 Transmission system
10, 10-1, 10-2 Transmission device
20, 20-1, 20-2, 20-3 Receiving device
21 Remote controller
30 Radio tower
40 EA server
80 Transmission path
90 Communication line
201 broadcasting tuner part
202 Broadcast signal processing part (SoC)
203 Output screen part
204 Audio output part
211-1 to 211-3 Input terminal
212-1 to 212-5 Output terminal
221 Demodulator I/F
222 Demultiplexer
223 Broadcast middleware
224 Descrambler part
225 Video/audio/subtitle decoder part
226 Presentation processing part
227 Emergency alert control part
228 Emergency alert information output part
229 Communication I/F
230 Communication middleware
231 Broadcast application processing part
232 Remote controller I/F
233 Receiver management part
234 Receiver application processing part
1000 Computer
1001 CPU

The invention claimed is:
1. A receiving device comprising:
receive circuitry configured to receive a broadcast signal; and
processing circuitry configured to:
process the broadcast signal that has been received, when in a standby state, enter an active state on a basis of emergency alert wakeup information included in the broadcast signal that has been received, and
in the active state, control presentation of emergency alert information on a basis of signaling acquired from the broadcast signal that has been received, and setting information related to the emergency alert information, the signaling including information associated with the emergency alert information, including identification of the emergency alert information, and an indication that the emergency alert information is new, updated, or cancelled,
wherein:
the setting information includes at least one of a setting related to an audience, a type, a priority, an event type, a language, or a relevant area of the emergency alert information, and
the processing circuitry is configured to cause the emergency alert information to be presented if the information associated with the emergency alert information and the setting information match.

2. The receiving device according to claim 1, wherein the processing circuitry is configured to:
acquire history information associated with the emergency alert information received in the past, and
control presentation of the emergency alert information on a basis of the signaling, the setting information, and the history information.

3. The receiving device according to claim 2, wherein:
the receiving device has a first mode corresponding to operation at normal start, and a second mode corresponding to operation at emergency alert, and
the processing circuitry is configured to control the presentation of the emergency alert information on a basis of the signaling, the receiving setting information, and the history information, in a case of the second mode.

4. The receiving device according to claim 2, wherein the history information includes at least a state and a display content of the emergency alert information received in the past.

5. The receiving device according to claim 2, further comprising recording circuitry that records the setting information and the history information, wherein the processing circuitry is configured to:
compare the information associated with the emergency alert information and the recorded history information, and
if the comparison result is a match, cause the emergency alert information to be presented.

6. The receiving device according to claim 2, wherein the history information includes at least a state or a display content of the emergency alert information received in the past.

7. The receiving device according to claim 1, wherein the processing circuitry is configured to:
identify a series of the emergency alert information on a basis of identification information included in the signaling, and
control the presentation of the emergency alert information for the identified series.

8. The receiving device according to claim 1, wherein the emergency alert wakeup information is included in a frame of a physical layer, and the signaling is included in an upper layer.

9. The receiving device according to claim 1 comprising a display and a speaker.

10. The receiving device according to claim 1, wherein the setting information is settable by a user.

11. The receiving device according to claim 1, wherein the signaling includes text of the emergency alert information.

12. The receiving device according to claim 1, wherein:
the signaling includes access information for obtaining a media resource associated with the emergency alert information, and the processing circuitry is configured to obtain and control presentation of the media resource.

13. The receiving device according to claim 1, wherein the processing circuitry is configured to control presentation of the emergency alert information based on a change in the wakeup information.

14. The receiving device according to claim 1, wherein power consumption of the receiving device in the standby state is suppressed.

15. A method of a receiving device comprising:
receiving a broadcast signal;
processing the broadcast signal that has been received;
when in a standby state, entering an active state on a basis of emergency alert wakeup information included in the broadcast signal that has been received;
in the active state, controlling presentation of emergency alert information on a basis of signaling acquired from the broadcast signal that has been received, and setting information related to the emergency alert information, the signaling including information associated with the emergency alert information, including identification of the emergency alert information, and an indication that the emergency alert information is new, updated, or cancelled, wherein the setting information includes at least one of a setting related to an audience, a type, a priority, an event type, a language, or a relevant area of the emergency alert information; and
causing the emergency alert information to be presented if the information associated with the emergency alert information and the setting information match.

16. The method according to claim 15 comprising acquiring history information associated with the emergency alert information received in the past, wherein controlling the presentation of the emergency alert information includes controlling the presentation of the emergency alert information on a basis of the signaling, the receiving setting information, and the history information.

17. The method according to claim 16, further comprising:
recording the setting information and the history information,
comparing information associated with the emergency alert information and the recorded history information, and
if the comparison result is a match, causing the emergency alert information to be presented.

18. The method according to claim 15, wherein:
the signaling includes identification information identifying a series of emergency alert information, and
controlling presentation of the emergency alert information includes controlling presentation for each series that has been identified.

19. The method according to claim 15, wherein the emergency alert wakeup information is included in a frame of a physical layer, and the signaling is included in an upper layer.

20. The method according to claim 15, wherein power consumption of the receiving device in the standby state is suppressed.

* * * * *